US012252916B2

(12) United States Patent
Kramer et al.

(10) Patent No.: US 12,252,916 B2
(45) Date of Patent: Mar. 18, 2025

(54) RETENTION ASSEMBLY FOR SECURING TOGETHER COUPLED HANDLE ASSEMBLIES OF CO-MOUNTED DOORS

(71) Applicant: Larson Manufacturing Company of South Dakota, Inc., Brookings, SD (US)

(72) Inventors: Kole Kramer, Brookings, SD (US); Michael W. Kondratuk, Brookings, SD (US); Jammey A. Rawden, Volga, SD (US); Bryan P. Zacher, Brookings, SD (US)

(73) Assignee: Larson Manufacturing Company of South Dakota, LLC, Brookings, SD (US)

(*) Notice: Subject to any disclaimer, the term of this patent is extended or adjusted under 35 U.S.C. 154(b) by 464 days.

(21) Appl. No.: 17/061,309

(22) Filed: Oct. 1, 2020

(65) Prior Publication Data

US 2022/0081945 A1 Mar. 17, 2022

Related U.S. Application Data

(60) Provisional application No. 63/036,187, filed on Jun. 8, 2020, provisional application No. 62/910,823, filed (Continued)

(51) Int. Cl.

*E05C 7/02* (2006.01)
*E05C 19/16* (2006.01)
*E05B 85/18* (2014.01)

(52) U.S. Cl.

CPC ................ *E05C 7/02* (2013.01); *E05B 85/18* (2013.01); *E05C 19/16* (2013.01)

(58) Field of Classification Search

CPC .... E05B 85/18; E05B 15/0073; E05B 55/005; E05B 65/04; E05B 9/10; E05B 47/0038; (Continued)

(56) References Cited

U.S. PATENT DOCUMENTS

| | | | | |
|---|---|---|---|---|
| 1,140,524 | A | 5/1915 | Mosler et al. | |
| 1,686,819 | A * | 10/1928 | Kirschbaum | E06B 5/00 49/56 |

(Continued)

FOREIGN PATENT DOCUMENTS

| | | |
|---|---|---|
| CN | 2186781 | 1/1995 |
| CN | 2206820 | 9/1995 |

(Continued)

OTHER PUBLICATIONS

International Search Report and Written Opinion of International Application No. PCT/US2024/016629, mailed Jun. 14, 2024, 9 pp.

*Primary Examiner* — Christine M Mills
*Assistant Examiner* — Faria F Ahmad
(74) *Attorney, Agent, or Firm* — Kagan Binder, PLLC

(57) ABSTRACT

A retention assembly secures together field-coupled handle assemblies of co-mounted doors and may include a first retention component mounted to or defined by a first magnet housing of a first door handle assembly operatively mounted to one of the co-mounted doors, and a second retention component mounted to or defined by a second magnet housing of a second door handle assembly operatively mounted to the other of the co-mounted doors, the first and second magnet housings arranged such that magnets carried by each align with and magnetically couple to one another and such that the first retention component aligns with the second retention component and mechanically couple to one another as the first and second door handle assemblies are brought into contact with each other.

24 Claims, 17 Drawing Sheets

Related U.S. Application Data on Oct. 4, 2019, provisional application No. 62/908,764, filed on Oct. 1, 2019.

(58) Field of Classification Search
CPC .......... E05B 63/143; E05B 63/04; E05C 7/02; E05C 19/16; Y10S 70/65
See application file for complete search history.

(56) References Cited

U.S. PATENT DOCUMENTS

| | | | | |
|---|---|---|---|---|
| 1,920,813 | A | 8/1933 | Storms | |
| 2,177,617 | A | 10/1939 | Hinton | |
| 2,219,344 | A | 10/1940 | Taylor | |
| 2,537,896 | A * | 1/1951 | Hinton | E05C 7/02 16/365 |
| 2,736,401 | A | 2/1956 | Milone | |
| 2,911,095 | A | 11/1959 | Hutch | |
| 3,024,501 | A | 3/1962 | McPhail | |
| 3,024,837 | A | 3/1962 | McPhail | |
| 3,164,228 | A | 1/1965 | Segre | |
| 3,881,220 | A | 5/1975 | Kiraly | |
| 4,001,972 | A | 1/1977 | Hurwitz | |
| 4,094,099 | A | 6/1978 | Birch | |
| 4,208,837 | A | 6/1980 | Black, Sr. et al. | |
| 4,295,514 | A * | 10/1981 | Johnson | E05D 7/1061 16/389 |
| 4,299,058 | A | 11/1981 | Spaulding | |
| 4,302,907 | A | 12/1981 | Jose et al. | |
| 4,389,817 | A | 6/1983 | Olberding | |
| 4,408,546 | A | 10/1983 | Schmidt | |
| 525,906 | A * | 9/1984 | Johnson | E05B 85/22 292/172 |
| 4,470,276 | A | 9/1984 | Bayless | |
| 4,660,873 | A | 4/1987 | Sholund | |
| 4,891,907 | A | 1/1990 | Rapaway | |
| 5,144,721 | A | 9/1992 | Schade | |
| 5,257,837 | A | 11/1993 | Bishop | |
| 5,474,345 | A | 12/1995 | Clark et al. | |
| 5,535,550 | A | 7/1996 | Yang | |
| 5,613,324 | A | 3/1997 | Theune | |
| 6,357,509 | B1 | 3/2002 | Lamazares | |
| 6,526,694 | B1 | 3/2003 | Cosgrove | |
| 6,807,833 | B1 | 10/2004 | Huang et al. | |
| 6,938,665 | B2 | 9/2005 | Lewis et al. | |
| 6,941,997 | B2 | 9/2005 | Butler | |
| 6,974,163 | B2 | 12/2005 | Peng et al. | |
| D525,906 | S | 8/2006 | Gut | |
| 7,950,439 | B2 | 5/2011 | Anderson | |
| 9,045,214 | B2 | 6/2015 | Koch et al. | |
| 9,228,386 | B2 | 1/2016 | Thielmann et al. | |
| 9,273,505 | B1 | 3/2016 | Knittel | |
| 9,540,853 | B2 | 1/2017 | Pickar et al. | |
| 10,233,669 | B2 * | 3/2019 | Huang | E05C 19/16 |
| 10,808,438 | B2 | 10/2020 | Takase et al. | |
| 11,098,509 | B2 * | 8/2021 | Huang | E05B 15/0073 |
| 11,905,740 | B2 | 2/2024 | Kondratuk et al. | |
| 2006/0225250 | A1 | 10/2006 | Yeremian | |
| 2009/0064738 | A1 | 3/2009 | Fan | |
| 2014/0132142 | A1 | 5/2014 | Kim et al. | |
| 2014/0132143 | A1 | 5/2014 | Kim et al. | |
| 2014/0132146 | A1 | 5/2014 | Kim et al. | |
| 2014/0232250 | A1 | 8/2014 | Kim et al. | |
| 2014/0232251 | A1 | 8/2014 | Kim et al. | |
| 2014/0292001 | A1 | 10/2014 | Nunez et al. | |
| 2018/0328077 | A1 | 11/2018 | Huang et al. | |
| 2019/0153756 | A1 | 5/2019 | Huang et al. | |
| 2022/0081937 | A1 * | 3/2022 | Kondratuk | E05B 63/143 |
| 2024/0279970 | A1 | 8/2024 | Huang et al. | |

FOREIGN PATENT DOCUMENTS

| | | | |
|---|---|---|---|
| CN | 202139954 | | 2/2012 |
| CN | 102535951 | A | 7/2012 |
| CN | 203640569 | | 6/2014 |
| CN | 108868376 | A | 11/2018 |
| DE | 465865 | | 9/1928 |
| KR | 20120063316 | A | 6/2012 |
| KR | 20160011864 | A | 2/2016 |
| TW | 106115225 | A | 5/2017 |
| TW | 107141798 | | 11/2018 |
| WO | 2024/178050 | A1 | 8/2024 |

* cited by examiner

SECTION 14-14

RETENTION ASSEMBLY FOR SECURING TOGETHER COUPLED HANDLE ASSEMBLIES OF CO-MOUNTED DOORS

CROSS-REFERENCE TO RELATED APPLICATIONS

This application claims the benefit of U.S. Provisional Patent Application No. 62/908,764, filed Oct. 1, 2019 and titled "RETENTION ASSEMBLY FOR SECURING TOGETHER FIELD-COUPLED HANDLE ASSEMBLIES OF CO-MOUNTED DOORS"; U.S. Provisional Patent Application No. 62/910,823, filed Oct. 4, 2019 and titled "RETENTION ASSEMBLY FOR SECURING TOGETHER FIELD-COUPLED HANDLE ASSEMBLIES OF CO-MOUNTED DOORS"; and U.S. Provisional Patent Application No. 63/036,187, filed Jun. 8, 2020 and titled "RETENTION ASSEMBLY FOR SECURING TOGETHER FIELD-COUPLED HANDLE ASSEMBLIES OF CO-MOUNTED DOORS" the entire contents of which are incorporated herein by reference in their entireties.

FIELD OF THE INVENTION

The present invention relates generally to door assemblies having two doors co-mounted to and within a single door frame of a building with each having a handle assembly configured to be field-coupled to the other, and more specifically to structures for securing together the field-coupled handle assemblies of the two doors.

BACKGROUND

Two doors may conventionally be co-mounted in a single doorway of a building, one example of which is a conventional exterior door and a conventional storm door co-mounted to and within a single door frame of a commercial or residential building. Some such co-mounted doors include handle assemblies configured to be field-coupled together, e.g., magnetically coupled together via attractive magnetic fields established by magnets carried by each handle assembly, such that the field-coupled handle assemblies operate together as a single handle assembly for both doors.

SUMMARY

The present disclosure may comprise one or more of the features recited in the attached claims, and/or one or more of the following features and combinations thereof. In a first aspect, a retention assembly is provided for securing together coupled handle assemblies of co-mounted doors each pivotably mounted at a hinge side thereof to a door frame so as to both open and close in the same direction. The retention assembly may comprise a first retention component mounted to or defined by a first linkage element housing of a first door handle assembly operatively mounted to one of the co-mounted doors, the first linkage element housing carrying a first plurality of linkage elements each having a linkage surface, and a second retention component mounted to or defined by a second linkage element housing of a second door handle assembly operatively mounted to the other of the co-mounted doors, the second linkage element housing carrying a second plurality of linkage elements each having a linkage surface, the first and second linkage element housings arranged such that the first plurality of linkage elements align with the second plurality of linkage elements and link to one another and such that the first retention component aligns with the second retention component and also mechanically couple to one another as the first and second door handle assemblies are brought into contact with each other. Preferably, the first and second linkage element housings are field-coupled to one another via magnetic linkage of first and second pluralities of magnets and are at the same time secured to one another via mechanical coupling of the first and second retention components.

BRIEF DESCRIPTION OF THE DRAWINGS

This disclosure is illustrated by way of example and not by way of limitation in the accompanying figures. Where considered appropriate, reference labels have been repeated among the figures to indicate corresponding or analogous elements.

DETAILED DESCRIPTION OF THE DRAWINGS

Figure 1A:
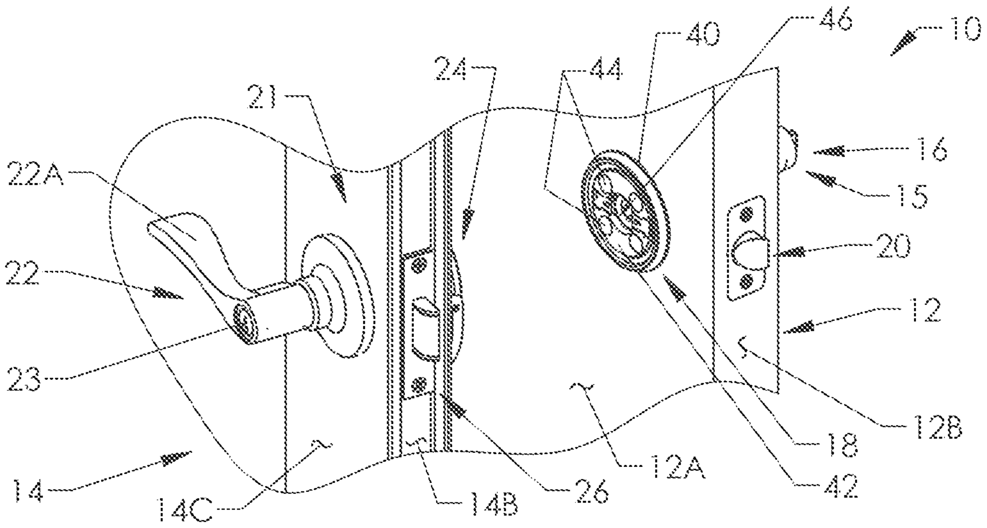
FIG. 1A is a perspective view of two co-mounted doors each including a handle assembly to be linked or coupled to the other with the handle assemblies including an embodiment of a retention assembly for further securing the handle assemblies together, shown from a perspective of an outer side of one of the doors and with the handle assemblies decoupled from one another.
Figure 1B:
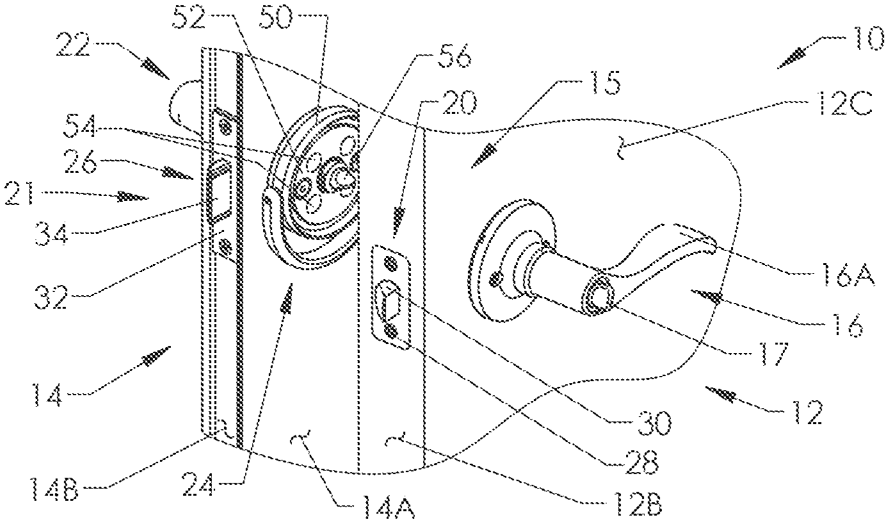
FIG. 1B is another perspective view of the co-mounted doors of FIG. 1A shown from a perspective of an outer side of the other door and with the handle assemblies decoupled from one another.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

This disclosure relates to various embodiments of a retention assembly for securing together linked handle assemblies of co-mounted doors. As used herein, the term "co-mounted" refers to two conventional doors hingedly mounted along a common side of each to a door frame or doorjamb of a residential, commercial or other building, such that the doors each open and close along a common side opposite that hingedly coupled to the door frame. The term "linked" as used herein means opposing portions of door handle assemblies mounted to each of the co-mounted doors, i.e., facing door handle assembly portions, are linked or coupled to one another and are held together by any affinity of materials, structural interaction, or attractive force that is sufficient to hold the door handle assemblies and co-mounted doors to one another when subjected to a separation force below a desired threshold level for selective user door separation. The term "field-coupled" as used herein, means opposing portions of door handle assemblies mounted to each of the co-mounted doors, i.e., facing door handle assembly portions, are coupled to one another and are held together by an attractive field, e.g., magnetic field established between magnets carried by each of the handle assembly portions or between at least one magnet carried by one of the handle assembly portions and at least one magnetically attractable structure, e.g., metal composite including one or more ferromagnetic materials, carried by the other handle assembly portion. The term "field coupleable," as used herein, refers to opposing portions of door handle assemblies mounted to each of the co-mounted doors that are configured to be field-coupled to one another. The term "retaining" or the phrase "securing together field-coupled handle assemblies" and similar such terms and phrases, as used herein, means mechanically creating an interference coupling of the field-coupled door handle assemblies to one another by a retention assembly such that, when so mechanically coupled together, a force required to be applied to one or both of the door handle assemblies and/or to one or both of the doors themselves in order to separate the door handle assemblies (and thus the doors) from one another is greater than the separation force that is required to separate the door handle assemblies from one another when only linked or field-coupled to one another.

Referring now to FIGS. 1A-3B, a portion of a co-mounted door arrangement 10 is shown which includes two conventional doors 12, 14 hingedly mounted to a door frame (not shown) in a conventional manner. A door handle assembly 15 is mounted to the door 12, and another door handle assembly 21 is mounted to the door 14. As will be described in detail below with respect to FIGS. 4A-9C, the door handle assemblies 15, 21 illustratively include a retention assembly for further securing together the handle assemblies 15, 21 when linked together.

The door handle assemblies 15 and 21 can utilize linkage elements 44 and 54 described in detail below that can comprise permanent magnets or electromagnets that are arranged to selectively attract to one another or repel from one another to link or unlink the doors 12 and 14 by way of the door handle assemblies 15 and 21. However, it is contemplated that the linkage elements 44 and 54 can comprise other elements than magnets that can be used similarly at least for linking to one another. For example, certain materials that are known to have levels of affinity to one another and thus can adhere with one another under certain conditions can be used so long as they release upon the application of a desired threshold force. Structural interaction of elements positioned together can be used such as including, for example, hook and loop mechanical fasteners or other micro-replicated structures.

It is also contemplated that in some embodiments no linkage elements need be utilized in addition to the retention assembly structures described herein. The purpose of the linkage elements is to rotationally link one handleset with another handleset so that they rotate together. Each of the retention assemblies and retention components thereof are provided, as described below, so as to maintain one handleset to the other handleset as the doors are moved together. Although the linkage elements would supplement the retention assemblies to prevent separation, they are not necessary for that purpose. Moreover, if rotational translation from one handset to the other handset is accommodated by the retention structure or additional structure at the interfaces of the handle assemblies, the linkage elements can be eliminated. Rotational connection for translation can be facilitated by such a structural component in one or both rotational directions.

The following disclosure is, however, directed to a preferred embodiment of the present invention wherein linkage element are utilized and magnets are used as the linkage elements based on magnetic force attraction or repulsion as field-coupled or decoupled elements with the understanding that any other suitable linkage or coupling elements may be used instead so long as a desired linking and unlinking is provided consistent with the following description.

The door handle assembly 15 includes a conventional handleset 16 operatively mounted to an inner face 12C of the door 12, a magnet assembly 18 operatively mounted to an outer face 12A of the door 12, and a conventional latch assembly 20 operatively mounted to a side surface 12B of the door 12 defined between the inner and outer faces 12C, 12A thereof. The handleset 16 and the magnet assembly 18 are operatively coupled to one another through a first bore (not shown) defined through the faces 12A, 12C of the door, and the latch assembly 20 is operatively coupled to the handleset 16 and to the magnet assembly 18 through a second bore (not shown) defined in the side surface 12B of the door 12 and intersecting the first bore, all in a conventional manner.

The handleset 16 of the handle assembly 15 includes a conventional lever 16A coupled to a conventional chassis (not shown) which extends into the first bore defined through the faces 12A, 12C of the door 12. The chassis is fixed in position relative to the door 12, and the lever 16A is rotatable relative to the chassis in a conventional manner. The latch assembly 20 includes a latch plate 28 mounted to the side surface 12B of the door 12, and a conventional latch tongue 30 extends through an opening in the latch plate 28. The lever 16A is operatively coupled to the latch assembly 20 via a shaft 48 (see, e.g., FIGS. 4A-4C) which extends through the chassis and the latch assembly 20 and into engagement with the magnet assembly 18 as will be described in greater detail below. Rotation of the lever 16A causes the shaft 48 to rotate which, in turn, causes the latch tongue 30 to retract within and extend from the latch plate 28. The door 12 can be opened when the lever 16A is rotated to retract the latch tongue 30 within the latch plate 28 as depicted by example in FIG. 2, and the door 12 can be closed and secured in the closed position when the lever 16A is rotated (or rotates under bias) to extend the latch tongue 30 from the latch plate 28, as depicted by example in FIG. 1B, so that it can be secured in a conventional manner to a strike plate (not shown) mounted to the door frame. A lock button or protrusion 17 is rotatably mounted to the lever 16A, as illustrated by example in FIGS. 1B-3B, and the lock button 17 is coupled to a locking spindle 49 (see, e.g., FIGS. 4A-4C) which extends through the chassis and the latch assembly 20 and into engagement with the magnet assembly as will be described in greater detail below. The lock button 17 and the locking spindle 49 rotate together relative to the lever 16A and relative to the chassis to which the lever 16A and the lock button 17 are operatively mounted.

Figure 4A:
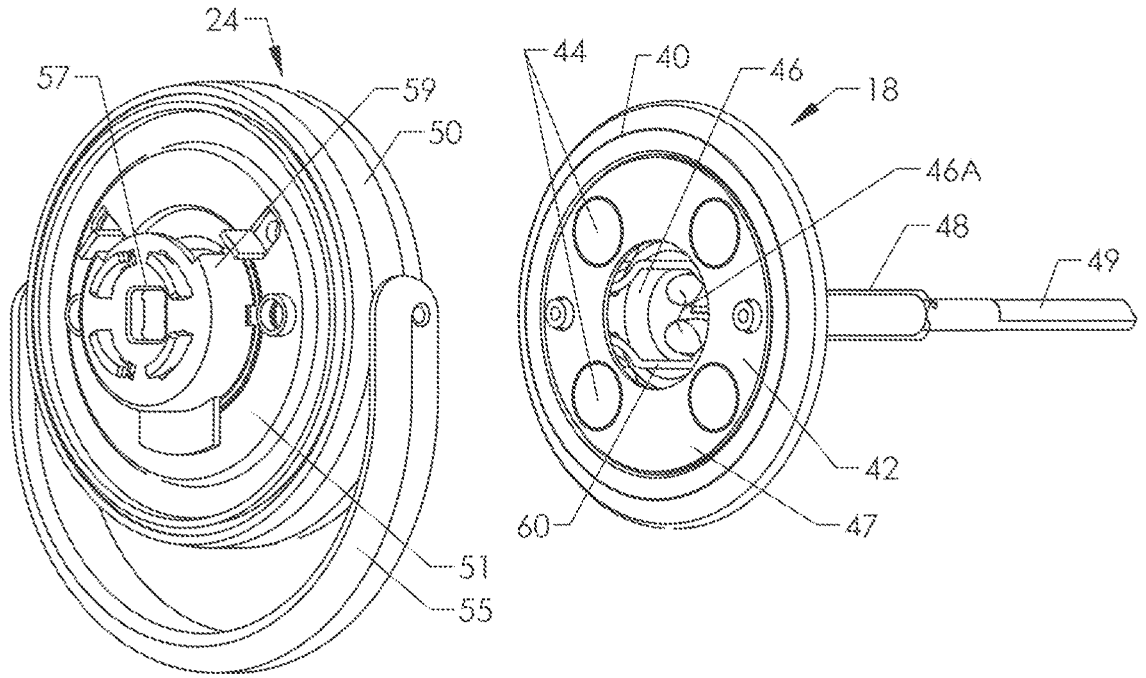
FIG. 4A is a perspective view of magnet assemblies of the two handle assemblies illustrated in FIGS. 1A-3B, shown from a perspective similar to FIG. 1A and illustrating one component of the retention assembly mounted over the lock receiver pocket of one of the magnet assemblies.
Figure 4B:
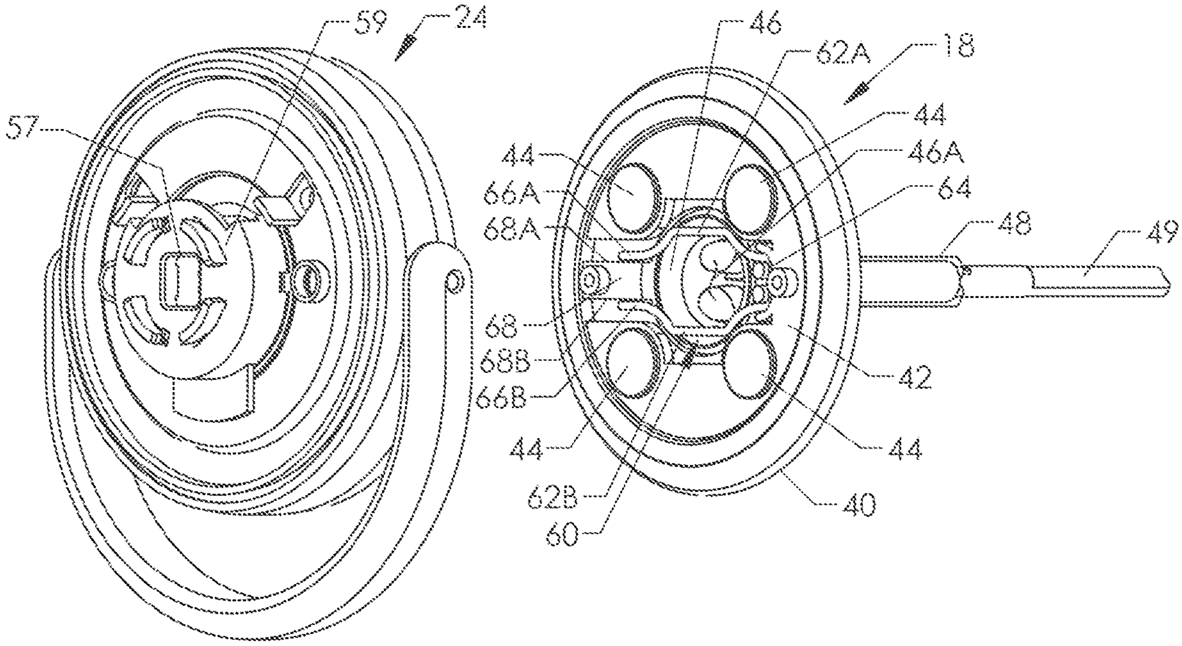
FIG. 4B is a perspective view similar to FIG. 4A but with the magnet assembly face plate removed to illustrate mounting of the one component of the retention assembly to the magnet assembly over the lock receiver pocket.
Figure 4C:
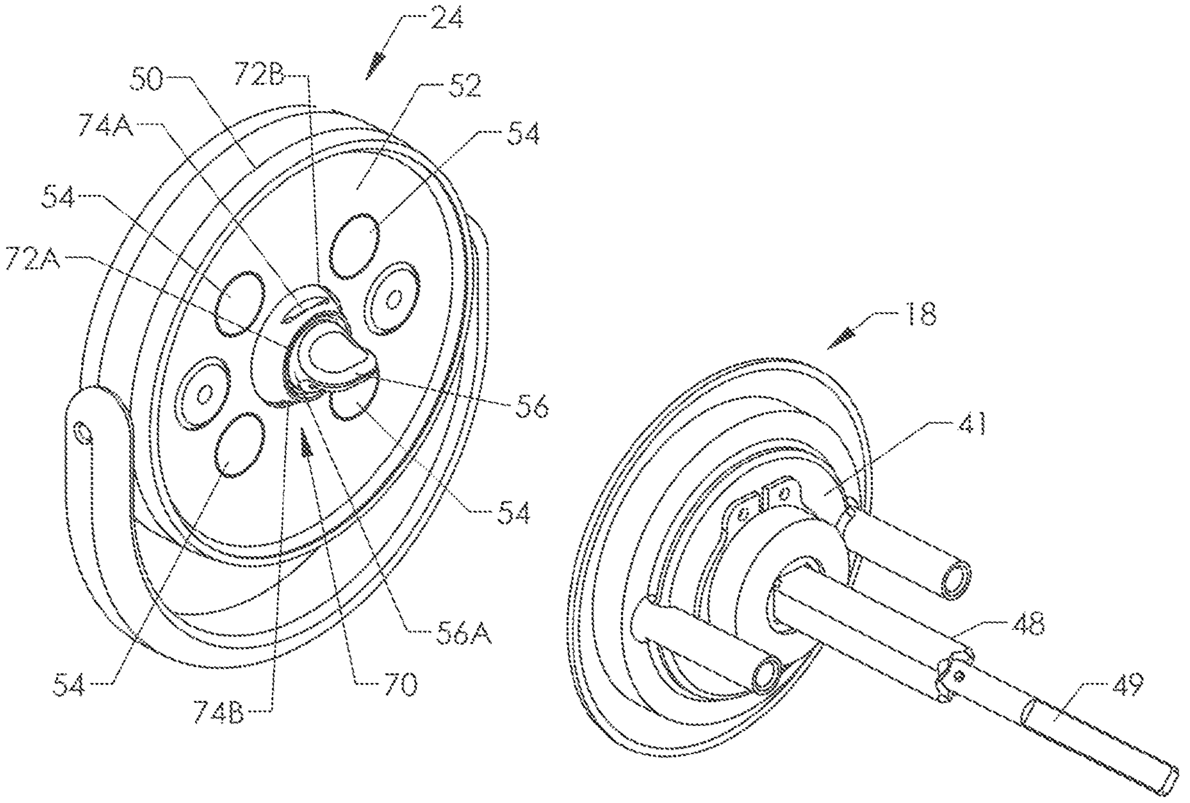
FIG. 4C is a perspective view of the magnet assemblies of the two handle assemblies illustrated in FIGS. 1A-3B, shown from a perspective similar to FIG. 1B and illustrating another component of the retention assembly mounted over the lock protrusion of the other magnet assembly.
Figure 5A:
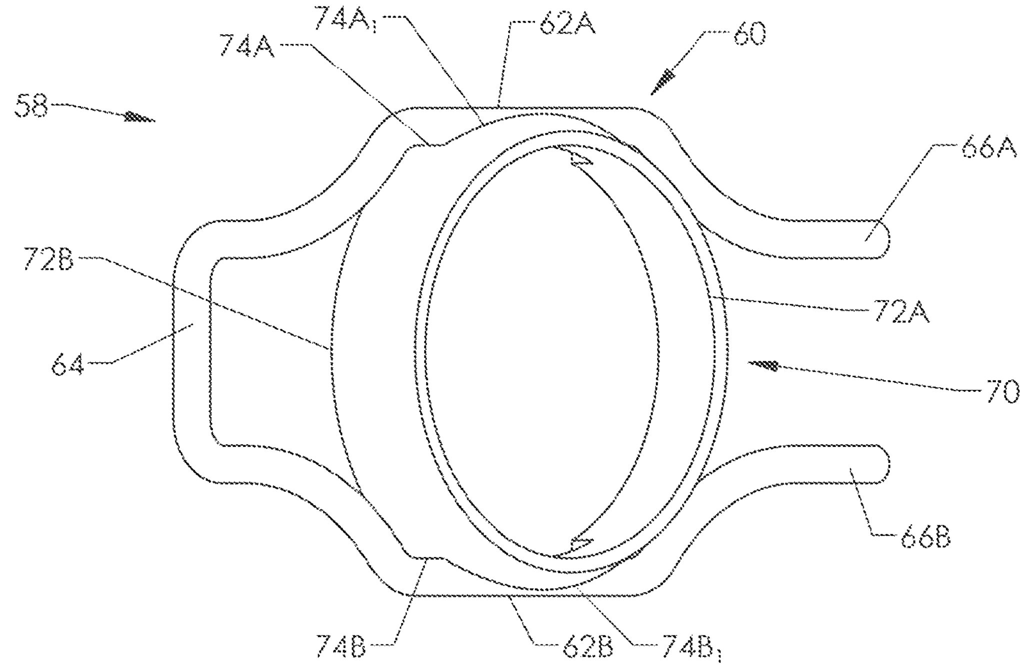
FIG. 5A is a perspective view of the retention assembly illustrated in parts in FIGS. 4A-4C, shown with the two components engaged with and secured to one another resulting from insertion of the lock protrusion of the magnet assembly on the left side of FIG. 4C into the lock receiver pocket of the magnet assembly on the right sides of FIGS. 4A and 4B upon field-coupling the respective door handle assemblies to one another as illustrated in FIG. 2.
Figure 5B:
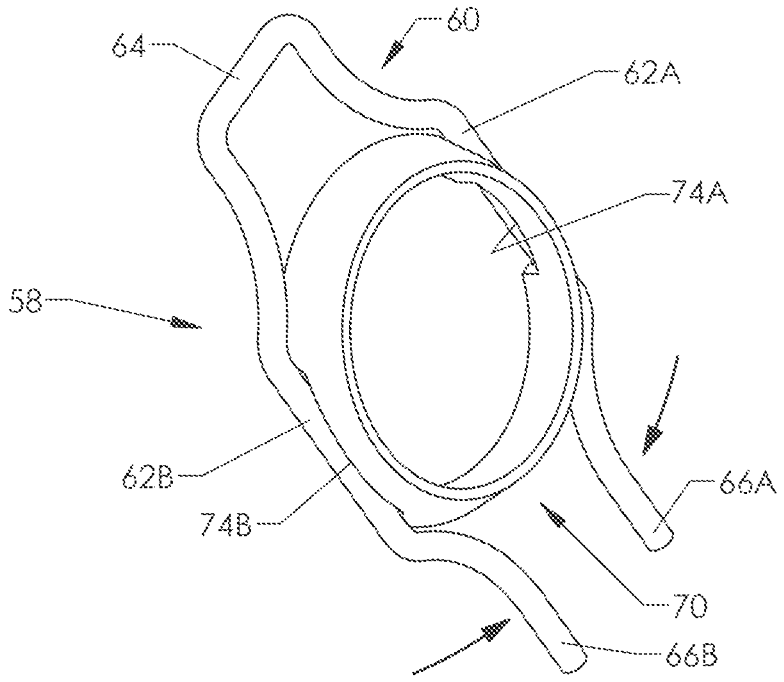
FIG. 5B is another perspective view of the retention assembly of FIG. 5A illustrating bias of the two legs of one of the components toward one another to maintain engagement of that component with the other component of the retention assembly.
Figure 5C:
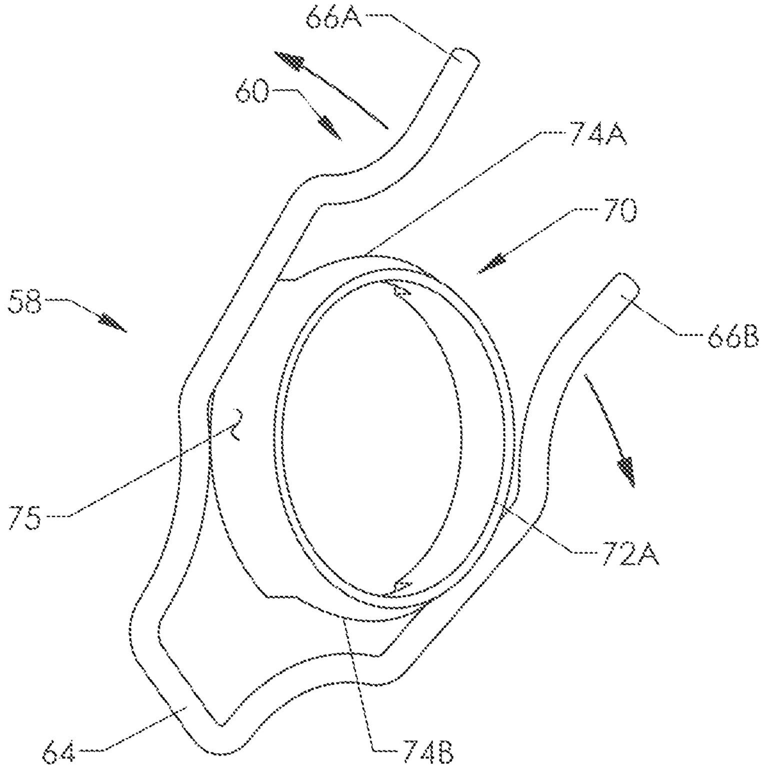
FIG. 5C is yet another perspective view of the retention assembly of FIGS. 5A and 5B illustrating disengagement of the two components via relative rotation therebetween.
Figure 6A:
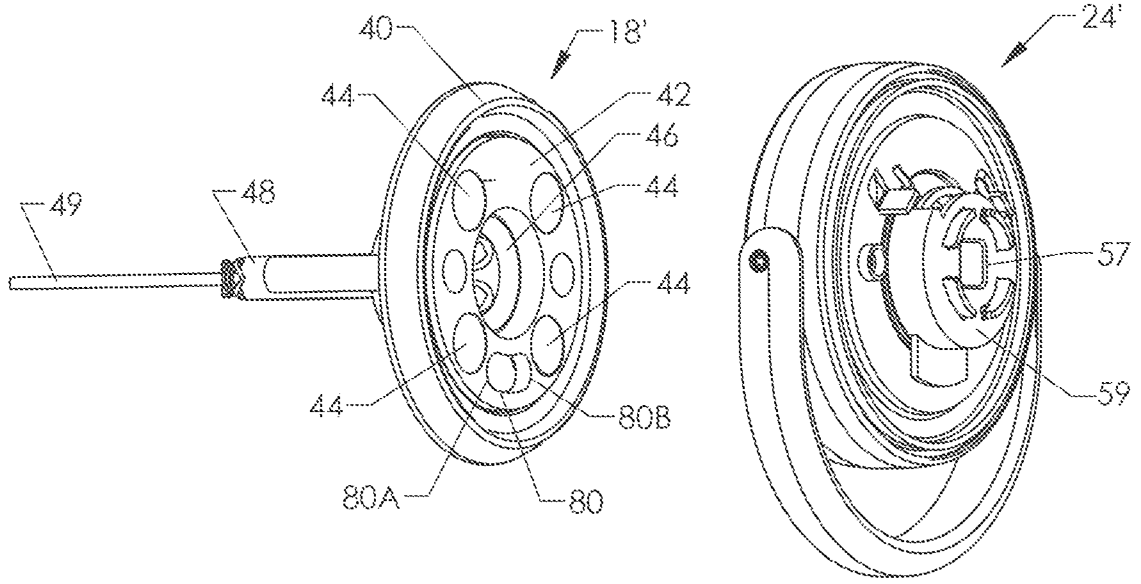
FIG. 6A is a perspective view of the magnet assemblies of the two handle assemblies illustrated in FIGS. 1A-3B, shown from a perspective similar to FIG. 1A and illustrating one component of another embodiment of a retention assembly for securing the field-coupled handle assemblies to one another.
Figure 6B:
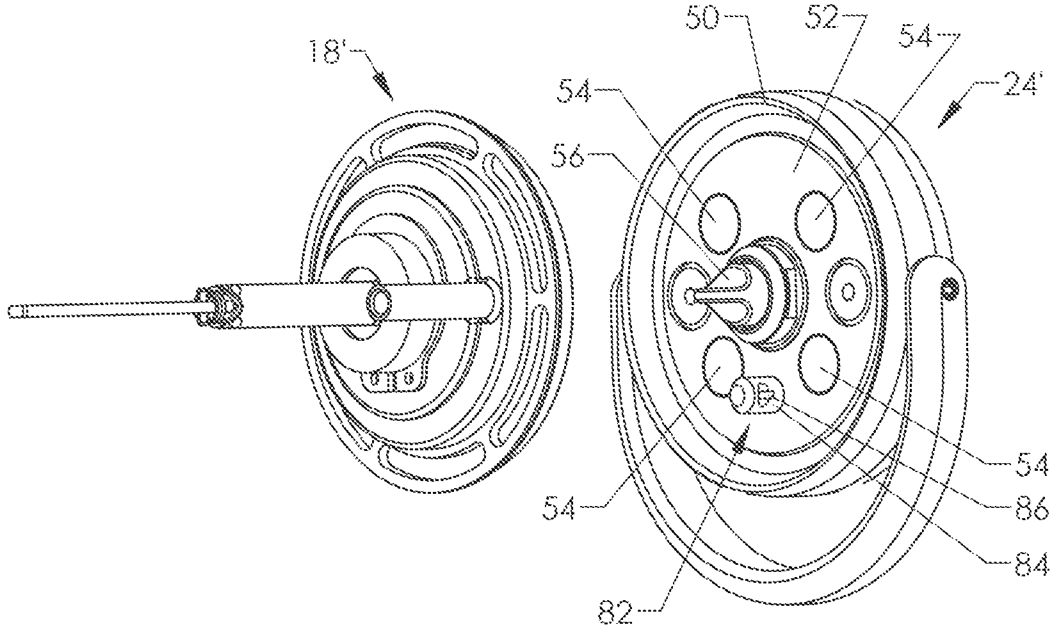
FIG. 6B is a perspective view of the magnet assemblies of the two handle assemblies illustrated in FIGS. 1A-3B, shown from a perspective similar to FIG. 1B and illustrating another component of the embodiment of the retention assembly illustrated in part in FIG. 6A.

The magnet assembly 18 includes a chassis 41 that is viewable from the rear as in FIG. 4C, which is affixed through the bore defined through the faces 12A, 12C of the door 12 to the chassis of the handleset 16 such that neither the chassis 41 nor the chassis of the handleset 16 rotates or otherwise moves with the lever 16A of the handleset 16 or with components carried within the chassis 41. In this regard, a cylindrical magnet housing 42 is positioned within a cylindrical opening of the chassis 41, and the magnet housing 42 is rotatably coupled to the lever 16A of the handleset 16 via the shaft 48 such that the lever 16A, the shaft 48 and the magnet housing 42 all rotate together relative to the door 12 and relative to the components of the handleset 16 affixed to the door 12. A ring portion 40 can be formed integrally with the magnet housing 42 or as a separate component connected to the magnet housing 42. A number of magnets 44 are mounted within openings defined axially through the cylindrical magnet housing 42, and the axial faces of the magnets 44 all define north or south magnetic poles. In the illustrated embodiment, the magnet housing 42 is configured to hold four magnets 44, although in alternate embodiments the magnet housing 42 may be configured to hold more or fewer magnets. In some alternate embodiments, the magnet housing 42 may instead be configured to hold one or more magnetically attractable structures rather than magnets, and in such embodiments the magnet assembly 24 of the door handle assembly 21 will carry one or more magnets which cooperate with the one or more magnetically attractable structures to field-couple the door handle assemblies 15, 21 together. In any case, any such magnet or magnets may provided purely as (a) structural component(s) and/or as one or more conventional electromagnets.

In any case, the cylindrical magnet housing 42 further defines a central opening axially therethrough sized to receive a generally cylindrical lock receiver 46 therein. The lock receiver 46 is coupled to the lock button 17 of the lever 16A of the handleset 16 via the spindle 49 such that the lock button 17, the spindle 49 and the lock receiver 46 are all rotatable together relative to the lever 16A and relative to the cylindrical magnet assembly 42. Rotation of the lock button 17 causes the spindle 49 to rotate which, in turn, causes the latch assembly 20 to lock such that the latch tongue 30 cannot retract within the latch plate 28. A recessed pocket 46A of the lock receiver 46 is configured to engage a lock button 56 of the door handle assembly 21 (see, e.g., FIGS. 4A-4C) when the door handle assemblies 15, 21 are field-coupled together, such that locking operation of the door handle assembly 15 as just described is likewise carried out in the door handle assembly 21 and vice versa.

The door handle assembly 21 likewise includes a conventional handleset 22 operatively mounted to an outer face 14C of the door 14, a magnet assembly 24 operatively mounted to an inner face 14A of the door 14, and a conventional latch assembly 26 operatively mounted to a side surface 14B of the door 14 defined between the inner and outer faces 14A, 14C thereof. The handleset 22 and the magnet assembly 24 are operatively coupled to one another through a first bore (not shown) defined through the faces 14A, 14C of the door 14, and the latch assembly 26 is operatively coupled to the handleset 22 and to the magnet assembly 24 through a second bore (not shown) defined in the side surface 14B of the door 14 and intersecting the first bore, all in a conventional manner. The handleset 22 likewise includes a conventional lever 22A coupled to a conventional chassis (not shown) which extends into the first bore defined through the faces 14A, 14C of the door 14. The chassis is fixed in position relative to the door 14, and the lever 22A is rotatable relative to the chassis in a conventional manner. The latch assembly 26 includes a latch plate 32 mounted to the side surface 14B of the door 14, and a conventional latch tongue 34 extends through an opening in the latch plate 32. The lever 22A is operatively coupled to the latch assembly 26 via a shaft (not shown) which extends through the chassis and the latch assembly 26 and into engagement with the magnet assembly 24 through an opening 57 in a rear portion 59 of the magnet assembly 24 (see, e.g., FIGS. 4A-4C). Rotation of the lever 22A causes the shaft to rotate which, in turn, causes the latch tongue 34 to retract within and extend from the latch plate 32. The door 14 can be opened when the lever 22A is rotated to retract the latch tongue 34 within the latch plate 32 as depicted by example in FIG. 2, and the door 14 can be closed and secured in the closed position when the lever 22A is rotated (or rotates under bias) to extend the latch tongue 34 from the latch plate 32, as depicted by example in FIGS. 1A and 1, so that it can be secured in a conventional manner to a strike plate (not shown) mounted to the door frame. A conventional key cylinder 23 is rotatably mounted to the lever 22A, as illustrated by example in FIG. 1A, and the key cylinder 23 is coupled to a locking spindle (not shown) which extends through the chassis and the latch assembly 26 and into engagement with the magnet assembly 24 as will be described in greater detail below. A keyway of the key cylinder 23 and the locking spindle rotate together relative to the lever 22A and relative to the chassis to which the lever 22A and the key cylinder 23 are operatively mounted.

The magnet assembly 24 includes a chassis 51 which is affixed through the bore defined through the faces 14A, 14C of the door 14 to the chassis of the handleset 22 such that nether the chassis 51 nor the chassis of the handleset 22 rotates or otherwise moves with the lever 22A of the handleset 22 or with components carried within the chassis 51. A cylindrical magnet housing 52 is positioned within a cylindrical opening of the chassis 51, and the magnet housing 52 is rotatably coupled to the lever 22A of the handleset 22 via the cam shaft described above such that the lever 22A, the cam shaft and the magnet housing 52 all rotate together relative to the door 14 and relative to the components of the handleset 22 affixed to the door 14. A number of magnets 54 are mounted within openings defined axially through the cylindrical magnet housing 52, and the axial faces of the magnets 54 all define north or south magnetic poles. In the illustrated embodiment, the magnet housing 52 is configured to hold four magnets 54, although in alternate embodiments the magnet housing 52 may be configured to hold more or fewer magnets. In some alternate embodiments, the magnet housing 52 may instead be configured to hold one or more magnetically attractable structures rather than magnets, and in such embodiments the magnet assembly 18 of the door handle assembly 15 will carry one or more magnets which cooperate with the one or more magnetically attractable structures to field-couple the door handle assemblies 15, 21 together.

The cylindrical magnet housing 52 further defines a central opening axially therethrough sized to receive a generally cylindrical lock button or protrusion 56 therethrough. The lock button 56 is coupled to the keyway of the key cylinder 23 of the lever 22A of the handleset 22 via the spindle described above such that the keyway of the key cylinder 23, the spindle and the lock button 56 are all rotatable together relative to the lever 22A and relative to the cylindrical magnet assembly 52. Rotation by a key of the keyway of the key cylinder 23 causes the spindle to rotate which, in turn, causes the latch assembly 26 to lock such that the latch tongue 34 cannot retract within the latch plate 32. The lock button 56 is configured to engage the interior pocket 46A of the lock receiver 46 of the door handle assembly 15 (see, e.g., FIGS. 4A-4C) when the door handle assemblies 15, 21 are field-coupled together, such that locking operation of the door handle assembly 21 as just described is likewise carried out in the door handle assembly 15 and vice versa.

A ring portion 50 is also preferably provided either integrally or as a separate component to rotate with the magnet housing 52. The ring portion 50 is further preferably operative connected to a handle 55. Whereas the ring portion 50 and the handle 55 are operatively connected to rotate together, the handle 55 can be used to rotate the magnet housing 52 and thus open door 14.

In the illustrated embodiment, the door 12 is, for example, a so-called "prime" door which serves as a main entrance door to a building. The face 12C is an "inner" face of the door 12 in that it is the surface of the door 12 that faces the interior of the building, and the face 12A is the "outer" face of the door 12 as it is the surface of the door 12 that faces the exterior of the building. The door 14 is, for example, a so-called storm door mounted to the door frame externally to the door 12 such that the door 14 is exposed to the outdoor environment and the door 12 is positioned between the door 14 and the interior of the building. The face 14A is the "inner" face of the door 14 in that it is the surface of the door 14 that faces the exterior surface of the door 12, and the face 14C is the "outer" face of the door 14 in that it is the surface of the door 14 that faces the exterior of the building to which the doors 12, 14 are mounted. It will be understood, however, that the door arrangement 10 just described is provided only by way of example, and that in alternate embodiments the door 14 may be the prime door and the door 12 may be the storm door. In other alternate embodiments, the "storm" door 14 (or 12) may instead be any other conventional door, examples of which include, but are not limited to, a security door, a screen door, a second prime door or the like. It will be further understood that whereas the attached figures depict one example mounting configuration of the doors 12, 14 as viewed from exterior as in FIG. 1, for example, i.e., left-handed mounting of the door hinges to the door frame and right-handed mounting of the door hardware, the concepts described herein are directly applicable to either left-handed or right-handed mounting of the doors 12, 14 and associated hardware.

The magnet assemblies 18, 24 of the door handle assemblies 15, 21 are mounted to the doors 12, 14 such that the magnets 44 carried by the magnet assembly 18 align with, and are of opposite polarity, than respective ones of the magnets 54 carried by the magnet assembly 24. As the doors 12, 14 are brought together, as illustrated by example in FIG. 2, the opposite-poled magnets 44, 54 magnetically couple to one another such that the magnet assemblies 18, 24, and thus the doors 12, 14, become field-coupled to one another. If one of the levers 16A, 22A of the handlesets 16, 22 is rotated in a direction to open the doors 12, 14, such rotation is transferred through the field-coupled magnet assemblies 18, 24 to rotate the other lever 16A, 22A, thereby causing both latch tongues 30, 34 to retract within their respective latch plates 28, 32 as illustrated by example in FIG. 2. Thus, if the lever 16A is rotated in a direction to open the door 12, such rotation is transferred through the shaft 48 to the cylindrical magnet housing 42 to cause it to rotate relative to the chassis 41. Because the magnets 44 carried by the magnet housing 42 are field-coupled to the magnets 54 carried by the magnet housing 52, rotation of the magnet housing 42 thus causes the magnet housing 52 to rotate in the same direction. Rotation of the magnet housing 52, in turn, causes the cam shaft coupled thereto to rotate in the door opening direction. Such rotation of the camshafts of the door handle assemblies 15, 21, in turn, causes the respective latch tongues 30, 34 to retract within their respective latch plates 28, 32. Rotation of the lever 22A in the direction to open the door 14 is likewise transferred to the handle assembly 15 to similarly cause the respective latch tongues 30, 34 to retract within their respective latch plates 28, 32 so that the doors 12, 14, while field-coupled together, can be together opened and closed. Moreover, while field-coupled together as illustrated by example in FIG. 2, the two door handle assemblies 15, 21 can be together and simultaneously locked and unlocked via actuation of the lock button 17 and/or actuation by a suitable key of the keyway of the key cylinder 23 as described in detail above.

In the illustrated embodiment, the door handle assembly 21 illustratively includes a mechanical stop which prevents rotation thereof in the direction opposite to the opening direction just described, or at least prevents rotation of the handle assembly 21 beyond a selected rotational angle of the handle assembly in the direction opposite to the opening direction. As the door handle assembly 15 is rotated in the direction opposite the opening direction (see, e.g., FIG. 3A) and the mechanical stop of the door handle assembly 21 is engaged, further rotation of the door handle assembly 15 in the same direction causes the faces of the field-coupled magnets 44, 54 to move radially away from one another. At some point, the magnetic fields established between the opposite-poled magnets 44, 54 are reduced by such rotation of the handle assembly 15 to a point at which the magnets 44, 54 are no longer field-coupled to one another and the magnet assemblies 18, 24 disengage from one another so that the doors 12, 14 can be separated from one another as illustrated by example in FIGS. 3A and 3B.

Further details relating to various embodiments of a co-mounted door arrangement of the type illustrated in FIGS. 1-3B and thus far described above can be found in co-pending U.S. Patent Publication No. 2020/0165846, which is owned by the applicant of the subject patent application, and which is published as international patent application WO 2017/181072, the disclosures of which are both incorporated herein by reference in their entireties. Other details relating to various embodiments of a co-mounted door arrangement also of the type illustrated in FIGS. 1-3B and thus far described above can be found in co-pending U.S. Provisional Patent Application No. 62/909,171, filed Oct. 1, 2019, which is owned by the applicant of the subject patent application; U.S. Provisional Patent Application No. 62/910,783, filed Oct. 4, 2019, which is owned by the applicant of the subject application; and U.S. Provisional Patent Application No. 63/036,183, filed Jun. 8, 2020, which is owned by the applicant of the subject application, the disclosures of which are both incorporated herein by reference in their entireties.

As briefly described above, the door handle assemblies 15, 21 illustratively include a retention assembly for further securing together the handle assemblies 15, 21 when field-coupled together as just described. Referring now to FIGS. 4A-5C, an embodiment of such a retention assembly 58 is shown. The retention assembly 58 illustratively includes two components; one component 60 mounted to the magnet assembly 18 of the door handle assembly 15, and another component 70 mounted to the magnet assembly 24 of the door handle assembly 21. As depicted in FIGS. 4A and 4B (FIG. 4A shows the magnet assembly 18 with a cover plate 47 mounted over the outwardly-facing axial face of the cylindrical magnet housing 42, and FIG. 4B shows the magnet assembly 17 with the cover plate 47 removed), the retention assembly component 60 is illustratively provided in the form of a retention clip having a closed end 64 secured to the axial face of the cylindrical magnet housing 42, upper and lower retention legs 62A, 62B each extending laterally away from the closed end 64 and over the recessed pocket 46A of the lock receiver 46, and spring legs 66A, 66B each extending laterally away from a respective one of the retention legs 62A, 62B. The retention clip 60 is illustratively a spring structure with the spring legs 66A, 66B biased toward one another. A spring leg positioning block 68 is attached to the front face of the magnet housing 42 on an opposite side of the lock receiver 46 at which the closed end 64 of the retention clip 60 is secured. The block 68 defines a top surface 68A which supports the spring leg 66A and a bottom surface 68B, opposite the top surface 68A, which supports the spring leg 66B. The spring legs 66A, 66B are biased against the top and bottom surfaces 68A, 68B of the positioning block 68, and the block 68 further operates to position of the retention legs 62A, 62B over and relative to the recessed pocket 46A of the lock receiver 46.

As further depicted by example in FIG. 4C, the retention assembly component 70 is illustratively provided in the form of a frustoconical retention ring having a smaller opening 72A sized to be received on the cylindrical shaft portion 56A of the lock button 56 and a larger opening 72B abutting the magnet housing 52 about the lock button 56. The retention component 70 preferably extends radially outward from the opening 72A to the opening 72B in the shape of a conical portion. A slot 74A is formed in and along a top surface of the retention ring 70, and another slot 74B is formed in and along a bottom surface of the retention ring 70 opposite the slot 74A. The slots 74A, 74B are illustratively oriented to run horizontally relative to a resting position of the magnet assembly 24 (i.e., with the lever 22A of the handleset 22 not being rotated in either direction), as are the retention legs 62A, 62B of the retention clip 60 relative to the resting position of the magnet assembly 18. The slots 74A, 74B are sized to receive a respective one of the retention legs 62A, 62B axially therein.

The retention legs 62A, 62B of the retention clip 60 are illustratively positioned relative to the lock receiver 46 such that the retention leg 62A contacts the retention ring 70 below the slot 74A and the retention leg 62B contacts the retention ring 70 above the slot 74B as the magnet assemblies 18, 24 are brought into contact with one another as the handle assemblies 15, 21 are being field-coupled to one another as described above. As the lock button 56 is forced into the pocket 46A of the lock receiver 46, the retention legs 62A, 62B ride upwardly along the outer, frustoconical surface 75 of the retention ring 70 toward the respective slots 74A, 74B, forcing the release legs 66A, 66B to separate from the top and bottom surfaces 68A, 68B of the positioning block 68 as the outer surface of the retention ring 70 expands the distance between the retention legs 62A, 62B. As the retention legs 62A, 62B are forced higher on the frustoconical outer surface of the retention ring 70, the legs 62A, 62B eventually reach the slots 74A, 74B and are received therein. The bias of the release legs 66A, 66B toward one another forces the retention legs 62A, 62B into the slots 74A, 74B, as illustrated by example in FIG. 5A, to secure the retention clip 60 to the retention ring 70 and thus secure the magnet assembly 18 to the magnet assembly 24. The interaction of the retention legs 62A, 62B within the slots 74A, 74B thus creates a physical interference holding the magnet housing 42 to the magnet housing 52 in an axial direction of the shaft 48. In some embodiments, the forward edges or sides $74A_1$, $74B_1$ of the slots 74A, 74B are formed at an acute angle relative to vertical. In such embodiments, the acute angle is illustratively selected so as to normally maintain the retention legs 62A, 62B within the slots 74A, 74B yet allow the retention legs 62A, 62B to exit the slots 74A, 74B if a force greater than a threshold force acts on the handle assemblies 15, 21 in a direction to separate them. Illustratively, the threshold force in such embodiments is selected to be less than that which may damage or break one or more components of the door handle assemblies 15, 21.

Figure 2:
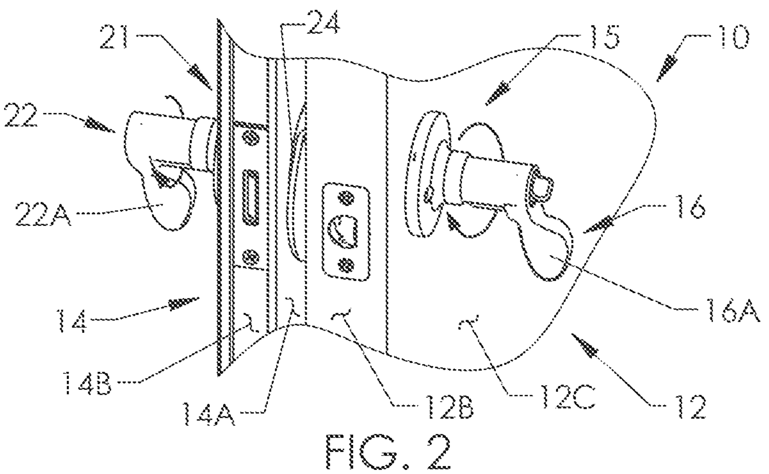
FIG. 2 is a perspective view similar to FIG. 1B shown with the two handle assemblies coupled to one another and illustrating simultaneous retraction of the latch tongues of each in response to rotational actuation of either outer door handle so that the two doors may be together opened or closed.
Figure 3A:
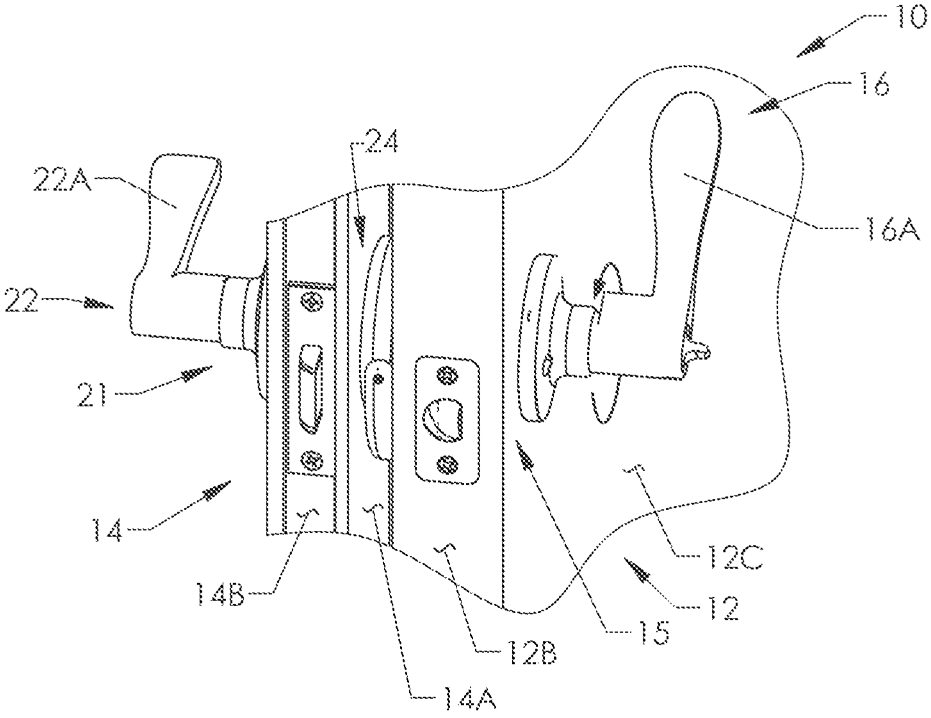
FIG. 3A is a perspective view similar to FIG. 2 shown with the two handle assemblies coupled to one another and illustrating decoupling of the handle assemblies via actuation of one of the door handles.
Figure 3B:
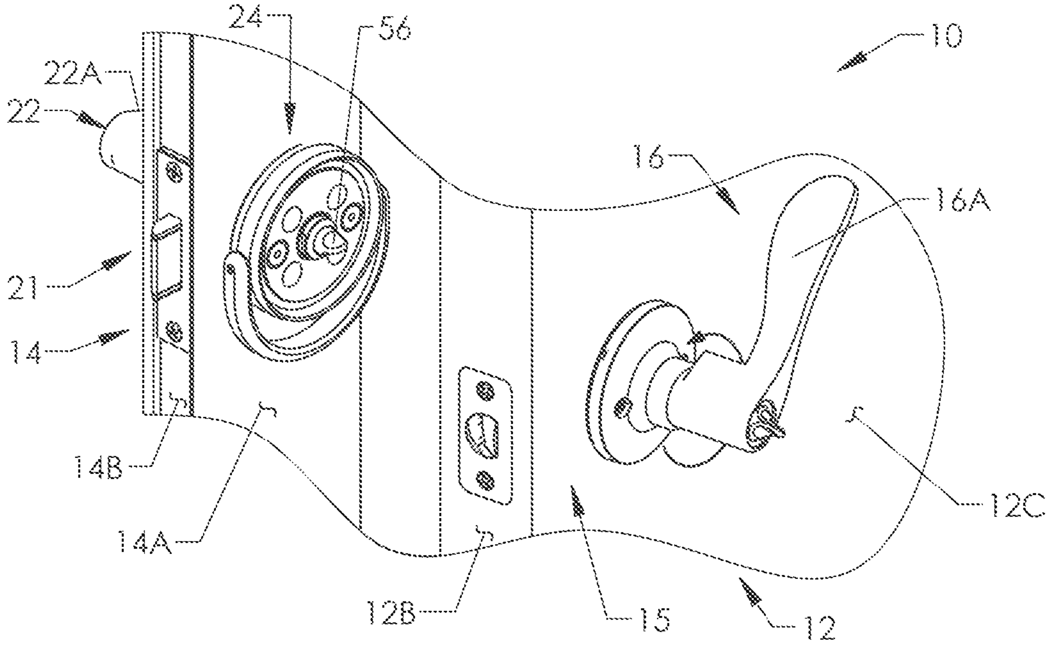
FIG. 3B is a perspective view similar to FIG. 3A shown with the handle assemblies decoupled from one another as a result of the actuation of the door handle illustrated in FIG. 3A.

In the illustrated embodiment, the retention assembly 58 is configured to secure the field-coupled magnet assemblies 18, 24 together as just described in their at rest states (i.e., with neither lever 16A, 22A rotated in either direction as illustrated in FIGS. 2-3B). When either magnet housing 42, 52 is rotated relative to the respective chassis 41, 51 in a direction which causes the latch tongues 30, 34 to retract within the respective latch plates 28, 32, (i.e., when opening the doors 12, 14 as illustrated in FIG. 2), the magnet housings 18, 24 rotate together as described above and the retention legs 62A, 62B are maintained within the slots 74A, 74B as the retention clip 60 and the retention ring 70 likewise rotate relative to the respective chassis 41, 51, as illustrated by example in FIG. 5B. Conversely, when the magnet housing 42 is rotated in the opposite direction and the magnet housing 52 is prevented from rotating therewith by the mechanical stop of the door handle assembly 21, the retention clip 60 rotates relative to the retention ring 70 and the radial motion of the retention clip 60 relative to the retention ring 70 causes the retention legs 62A, 62B to radially exit the slots 74A, 74B onto the outer surface 75 of the retention ring 70 as illustrated by example in FIG. 5C. This forces the release legs 66A, 66B further away from the top and bottom surfaces 68A, 68B of the positioning block 68 as also illustrated by example in FIG. 5C. The inward bias of the release legs 66A, 66B toward one another forces the retention legs 62A, 62B axially along the outer surface 75 of the retention ring 70 away from the slots 74A, 74B and toward the opening 72A as the inward bias of the release legs 66A, 66B forces the legs 66A, 66B toward one another and thereby separates the retention legs 62A, 62B and thus the retention clip 60 from the retention ring 70. Eventually, the release legs 66A, 66B contact the top and bottom surfaces 68A, 68B of the positioning block 68 which repositions the retention legs 66A, 66B to their pre-contact positions illustrated in FIGS. 4A and 4B.

Referring now to FIGS. 6A-7B, another embodiment of a retention assembly 85 is shown. The retention assembly 85 illustratively includes two components; one component 80 defined on the magnet assembly 18' of the door handle assembly 15, and another component 82 mounted to the magnet assembly 24' of the door handle assembly 21. As depicted by example in FIG. 6A, the retention assembly component 80 is illustratively provided in the form of an arcuate slot 80 formed through the magnet housing 42 of the magnet assembly 18' along a vertically bottom edge of the housing 42. The slot 80 terminates at opposite ends 80A, 80B thereof. As depicted by example in FIG. 6B, the retention assembly component 82 is illustratively provided in the form of a post 84 having one end mounted to the outer face of the magnet housing 52 of the magnet assembly 24' vertically beneath the lock button 56 and an opposite end extending axially away from the outer face of the magnet housing 52. A spring-biased pin 86 illustratively extends laterally from the post 84 adjacent to the free end thereof. The pin 86 is illustratively configured to be normally biased outwardly from the post 84 but to retract within the post 84 in response to force applied to a front surface of thereof. In some alternate embodiments, the spring-biased pin 86 may be replaced with a spring-biased ball or other such structure.

Figure 7A:
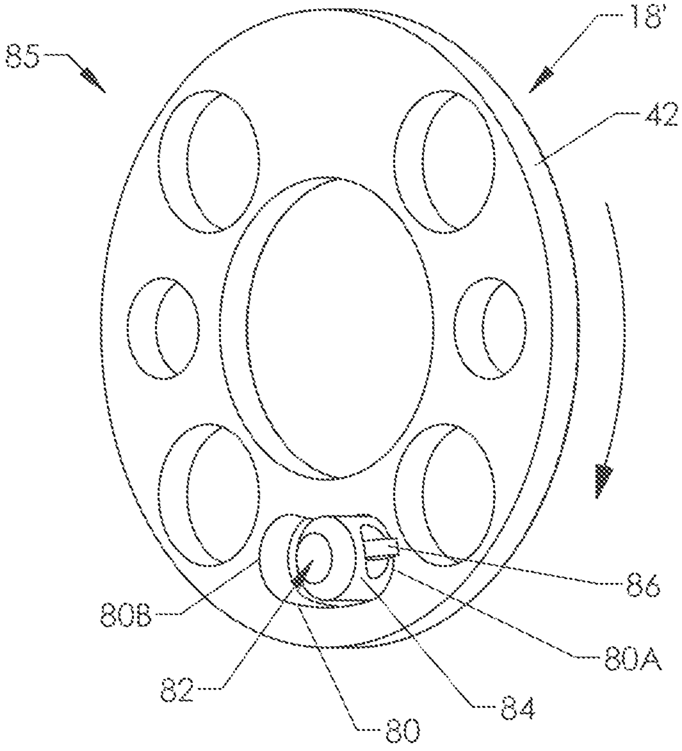
FIG. 7A is a perspective view of a portion of the magnet assembly illustrated on the left side of FIG. 6A which includes one component of the retention assembly, and of the component of the retention assembly illustrated on the right side of FIG. 6B, shown with the two components engaged with and secured to one another resulting from field-coupling the respective door handle assemblies to one another as illustrated in FIG. 2.
Figure 7B:
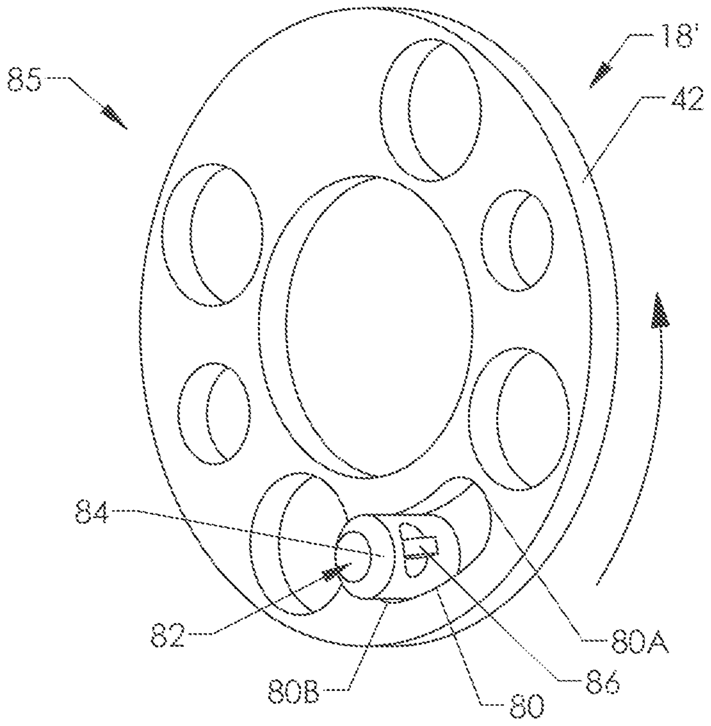
FIG. 7B is a perspective view similar to FIG. 7A illustrating relative rotation between the magnet assemblies to disengage the components of the retention assembly.
Figure 8A:
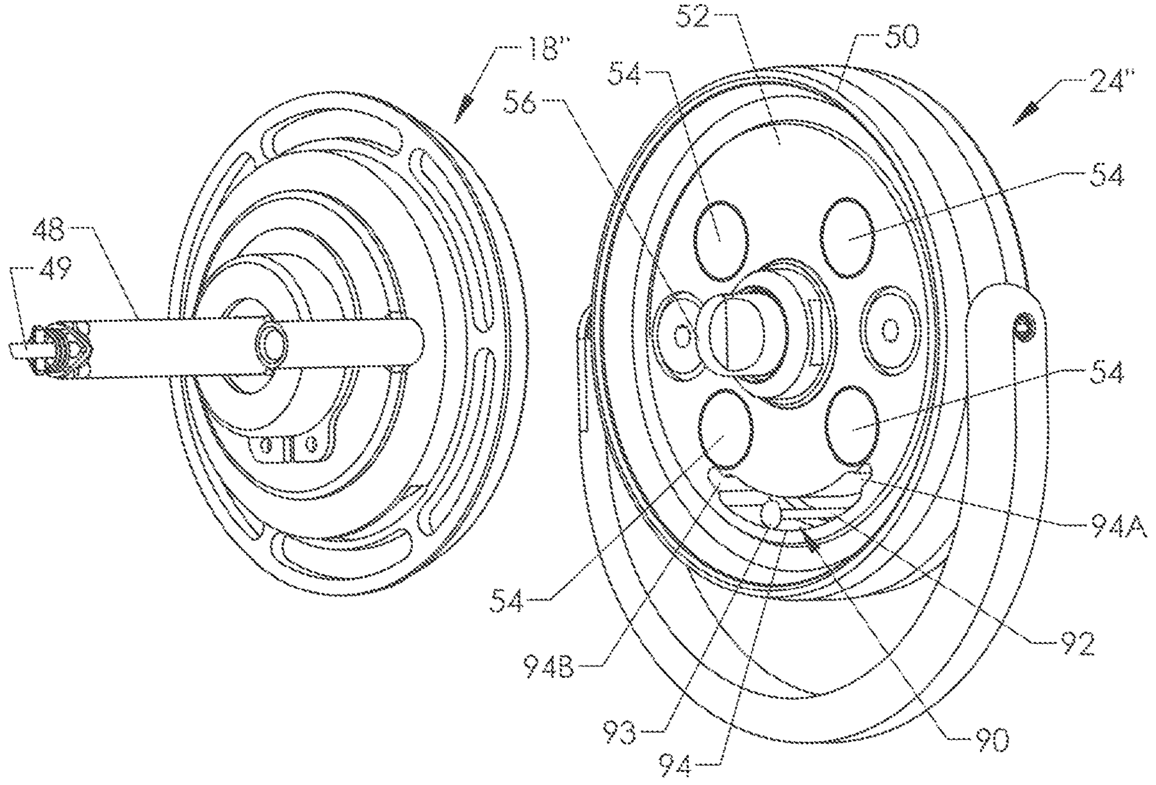
FIG. 8A is a perspective view of the magnet assemblies of the two handle assemblies illustrated in FIGS. 1A-3B, shown from a perspective similar to FIG. 6B and illustrating one component of yet another embodiment of a retention assembly for securing the field-coupled handle assemblies to one another.
Figure 8B:
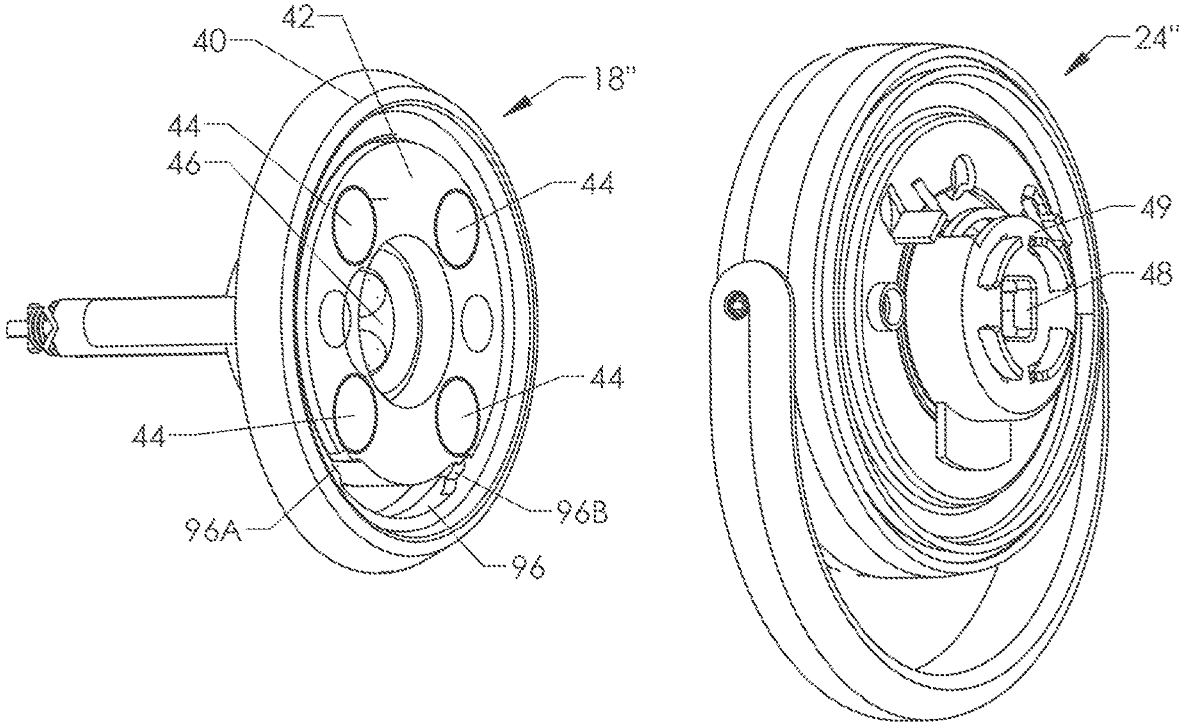
FIG. 8B is a perspective view of the magnet assemblies of the two handle assemblies illustrated in FIGS. 1A-3B, shown from a perspective similar to FIG. 6A and illustrating another component of the embodiment of the retention assembly illustrated in part in FIG. 8A.

The post 84 of the retention assembly component 82 is illustratively positioned relative to the slot 80 such that the magnet housing 42 adjacent to the end 80A of the slot 80 contacts the pin 86 and forces it to retract within the post 84 so that the free end of the post 84 enters the slot 80 as the magnet assemblies 18', 24' are brought into contact with one another as the handle assemblies 15, 21 are being field-coupled to one another as described above. As the pin 86 clears the end 80A of the slot 80, the pin is forced outwardly from the post 84 against the backside of the magnet housing 42 adjacent to the end 80A of the slot 80, as illustrated by example in FIG. 7A, to thereby secure the retention assembly component 82 the magnet housing 42 and thus secure the magnet assembly 18' to the magnet assembly 24'. The interaction of the spring biased pin 86 with the backside of the magnet housing 42 adjacent to the slot 80 and near the end 80A thus creates a physical interference holding the magnet housing 42 to the magnet housing 52 in an axial direction of the shaft 48. When either magnet housing 42, 52 is rotated relative to the respective chassis 41,50 in a direction which causes the latch tongues 30, 34 to retract within the respective latch plates 28, 32, (i.e., when opening the doors 12, 14 as illustrated in FIG. 2), the magnet housings 18', 24' rotate together as described above and the post 84 is maintained within the slot 80 as the post 84 and the slot 80 likewise rotate relative to the respective chassis 41, 51, as also illustrated in FIG. 7A. Conversely, when the magnet housing 42 is rotated in the opposite direction and the magnet housing 52 is prevented from rotating therewith by the mechanical stop of the door handle assembly 21, the slot 80 rotates relative to the post 84 in a direction which draws the post 84 and pin 86 away from the end 80A of the slot 80, as illustrated by example in FIG. 7B, so that the post 84 and pin 86 can be drawn axially out of and away from the slot 80 as the magnet assemblies 18', 24' separate from one another.

Referring now to FIGS. 8A-9C, yet another embodiment of a retention assembly 95 is shown. The retention assembly 95 illustratively includes two components; one component 90 defined on and extending into the magnet assembly 24" of the door handle assembly 21, and another component 96 defined on the magnet assembly 18" of the door handle assembly 15. As depicted by example in FIG. 8A, the retention assembly component 90 is illustratively provided in the form of a post 92 with a head 93 mounted to a free end thereof extending from an arcuate slot 94 formed through the magnet housing 52 of the magnet assembly 24" along a horizontally bottom edge of the housing 52. The opposite end of the post 92 is illustratively mounted to a stationary structure of the door handle assembly 21 so that the post 92 and head 93 do not rotate with the magnet assembly 24". The slot 94 terminates at opposite ends 94A, 94B thereof. As depicted by example in FIG. 8B, the retention assembly component 96 is illustratively provided in the form of an arcuate slot 96 formed through the magnet housing 42 of the magnet assembly 18" along a horizontally bottom edge of the housing 42. The slot 96 terminates at opposite ends 96A, 96B thereof.

The slots 94 and 96 are illustratively identical in size, and both are shaped to be wider in the centers than at the respective ends 94A, 94B and 96A, 96B. Preferably, the middle portion of each slot 94 and 96 is wide enough for the head 93 to easily pass. The end portions 94A, 94B and 96A, 96B comprise narrow slot portions that are larger than the size of the post 92 but smaller than the size of the head 93. For the ends 96A and 96B of slot 96 of magnet assembly 18", in particular, the smaller slot portions preferably comprise key-slot portions. These key-slot portions allow the head 93 to move along the key slots as it rotates past the wide middle slot portion to create a mechanical interference in the axial direction of shaft 48 once an allowed rotation is provided to either the magnet assembly 18" or the magnet assembly 24". Slot 94 can include smaller end portions at 94A, 94B, but need not so long as the slot extends at least as long as the arcuate extension of the slot 96 including ends 96A, 96B.

Figure 9A:
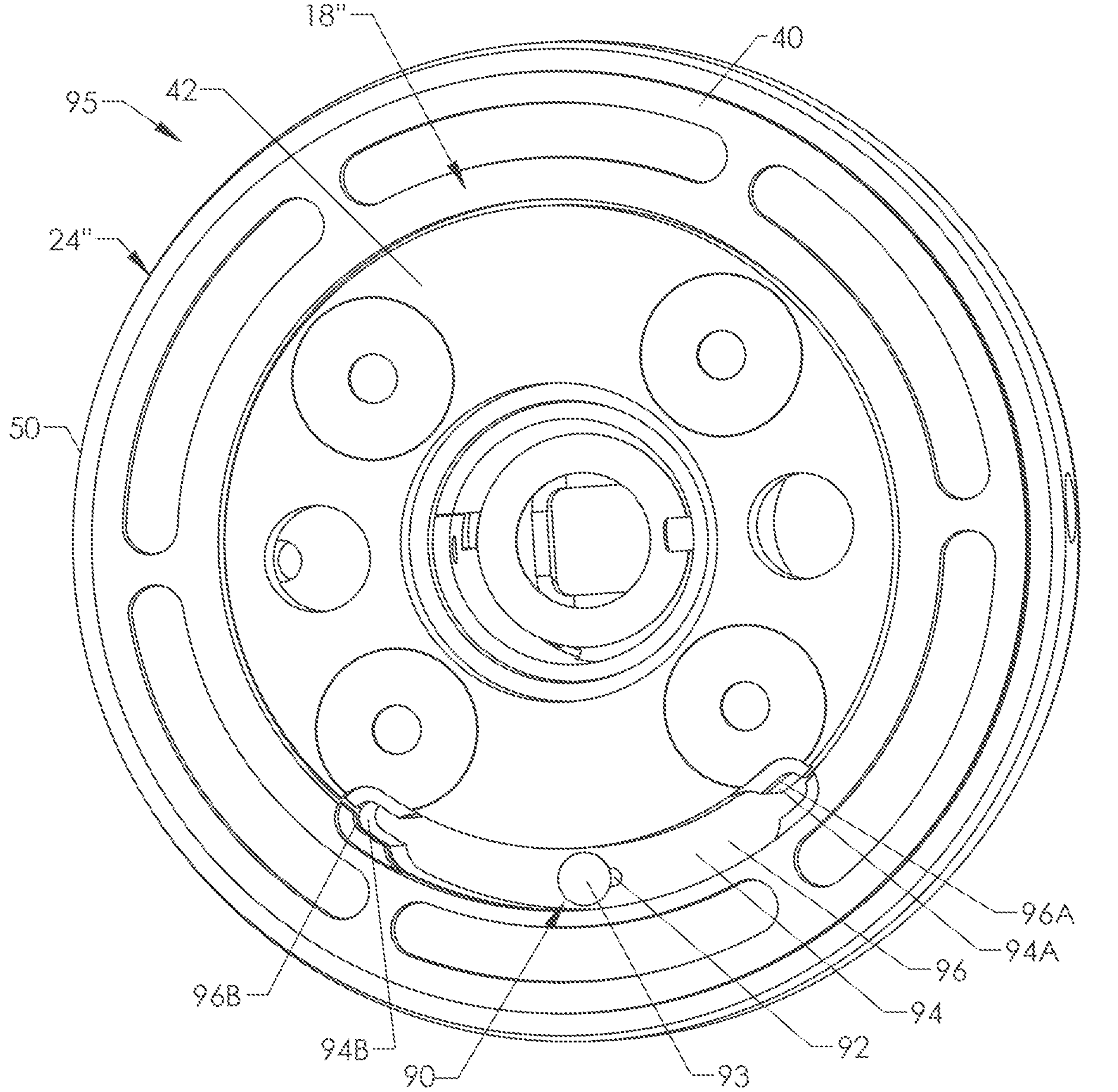
FIG. 9A is a perspective view of a portion of the magnet assembly illustrated on the left side of FIG. 8B which includes one component of the retention assembly, and of the magnet assembly illustrated on the right side of FIG. 6A, shown with one of the components inserted into the other resulting from field-coupling the respective door handle assemblies to one another as illustrated in FIG. 2.
Figure 9B:
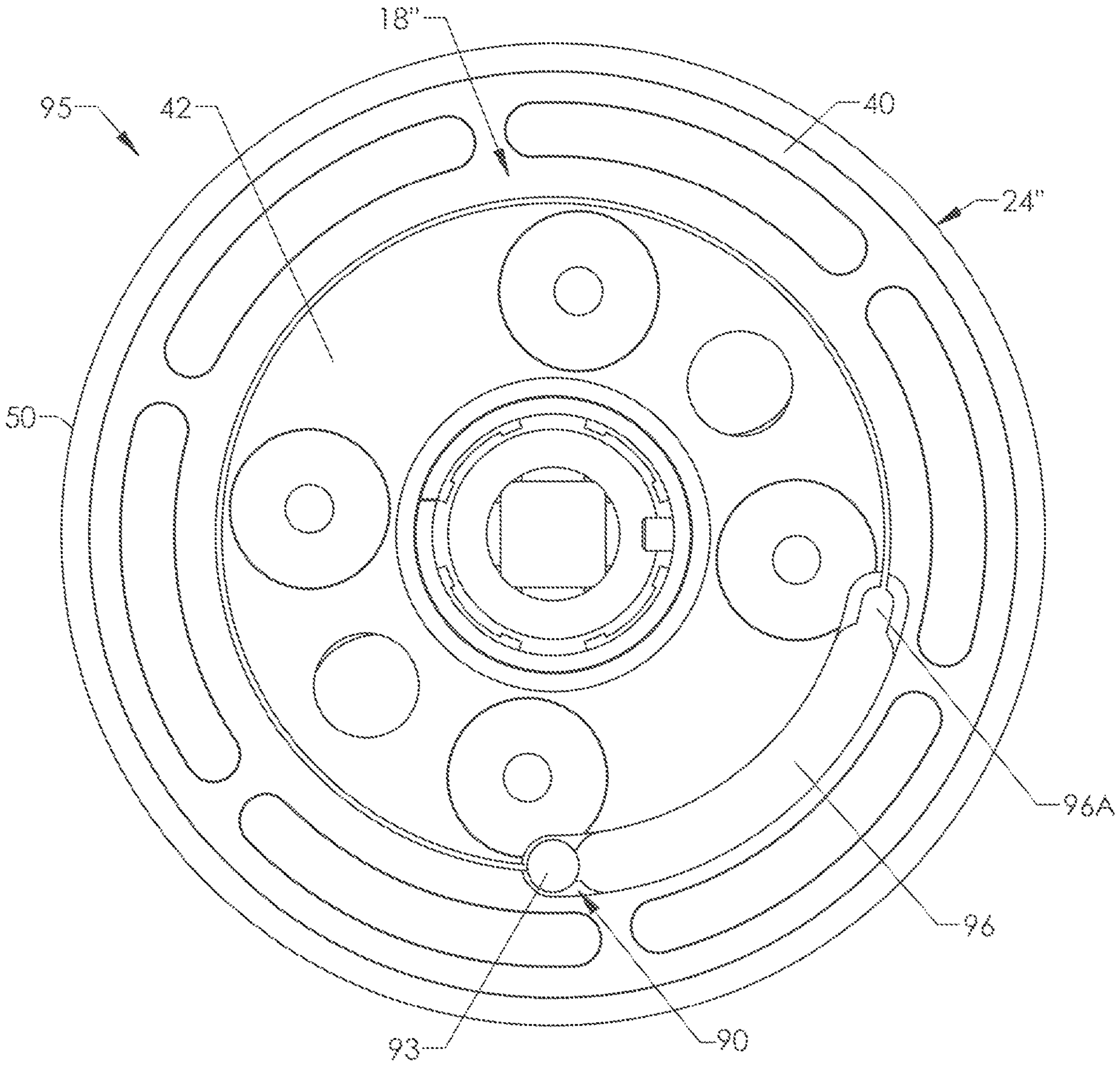
FIG. 9B is a perspective view similar to FIG. 9A and illustrating relative rotation between the magnet assemblies in one direction to a position in which the two components of the retention assembly engage one another and secure the magnet assemblies together.
Figure 9C:
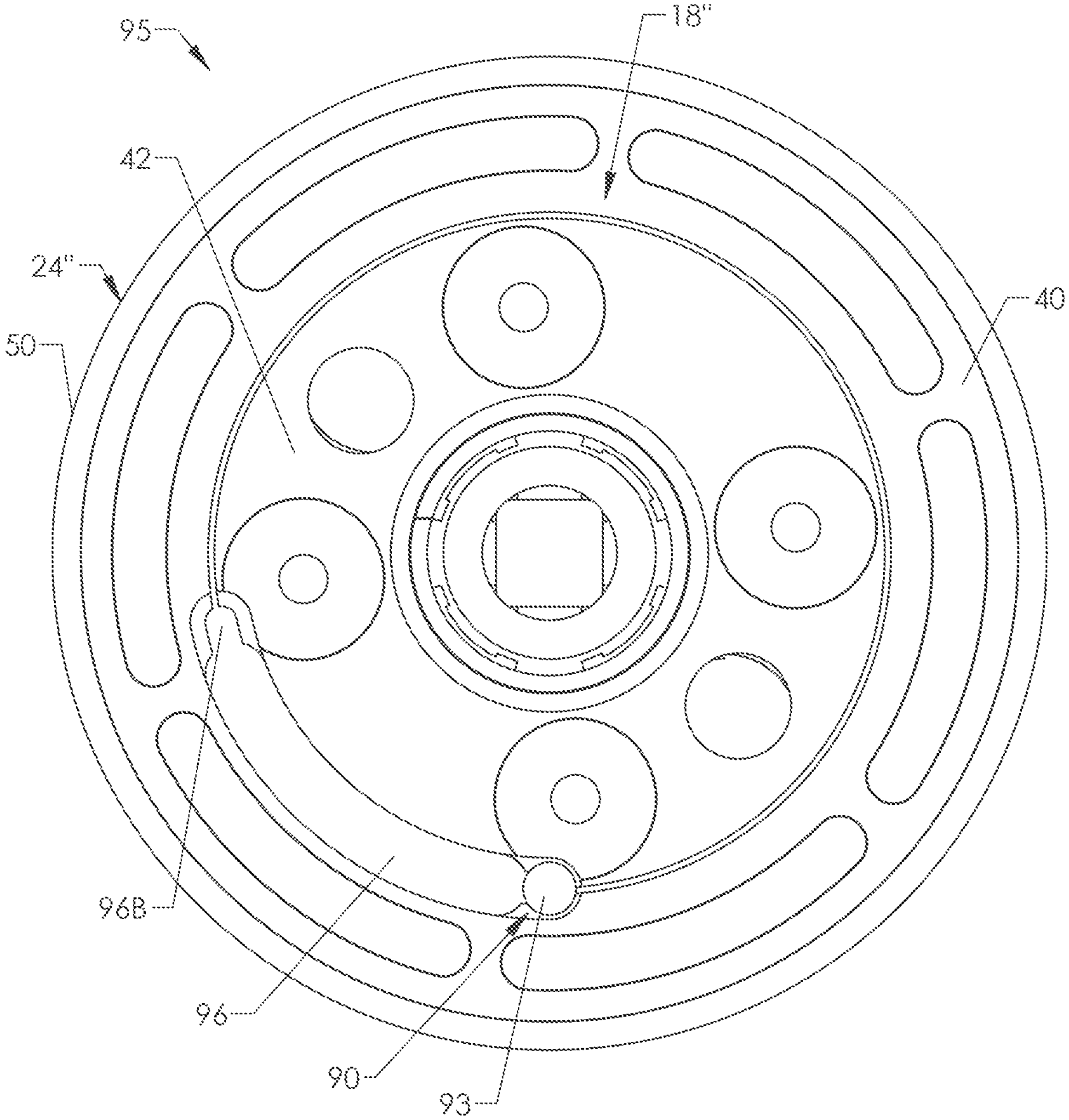
FIG. 9C is a perspective view similar to FIGS. 9A and 9B and illustrating relative rotation between the magnet assemblies in a direction opposite that shown in FIG. 9B to another position in which the two components of the retention assembly engage one another and secure the magnet assemblies together.

The post 92 of the retention assembly component 90 is illustratively positioned relative to the slot 94 such that the post 92 and head 93 extend through the slot 94 at approximately the center of the slot 94 where the slot 94 is the wide. As shown by example in FIG. 9A, the slots 94 and 96 are aligned with one another as the magnet assemblies 18", 24" are brought into contact with one another as the handle assemblies 15, 21 are being field-coupled to one another as described above, and the post 92 and head 93 extend through the aligned slots at approximately the center of each. In this position, the post 92 and head 93 combination does not act to secure the magnet assembly 18" to the magnet assembly 24". As the post and head 93 are stationary relative to the magnet assemblies 18", 24", however, rotation of the magnet assemblies 18", 24" together in one direction causes the head 93 of the post 92 to engage a backside surface of the reduced-width key-slot end 96B of the slot 96 and thereby creates a physical interference to prevent axial movement of the magnet assemblies 18", 24" away from one another as illustrated by example in FIG. 9B. As further illustrated in FIG. 9C, rotation of the magnet assemblies 18", 24" together in the opposite direction causes the head 93 of the post 92 to engage the reduced-width key-slot end 96A of the slot 96 and thereby also create a physical interference to prevent axial movement of the magnet assemblies 18", 24" away from one another. In this embodiment, the post 92 and head 93 do not operate as a retention assembly to prevent axial movement of the magnet assemblies 18", 24" away from one another in the at-rest position of the door handle assemblies 15, 21 as in the previous embodiments described above. Rather, the post 92 and head 93 operate as a retention assembly to prevent axial movement of the magnet assemblies 18", 24" away from one another only when the field-coupled magnet assemblies 18", 24" are rotated together by an amount in a rotary direction which causes the latch tongues 30, 34 to at least partially retract within the respective latch plates 28, 32 (i.e., during opening and closing of the doors 12, 14), as illustrated in FIG. 9B. Moreover, as the opposite ends of the slots 94, 96 operate in a like manner, as illustrated in FIG. 9C, the embodiment illustrated in FIGS. 8A-9C can accommodate both right-hand and left-hand mounting configurations of the doors 12, 14 and the door handle assemblies 15, 21.

In some embodiments, the head 93 may be formed of a rigid or semi-rigid material. In some alternate embodiments, the head 93 may be formed of a semi-rigid or deformable material configured to yield, while engaged with one of the ends of the slots 92, 94, with sufficient force applied to the door handle assemblies 15, 21 and/or to the doors 12, 14 in a direction intended to separate them, to thereby allow the doors 12, 14 to separate without damaging any of the components of the handle assembly 15 and/or the handle assembly 21.

The embodiments illustrated in the attached figures have been described herein as mechanically coupling together the various embodiments of the magnet assembly 18, 18', 18" to the respective magnet assembly 24, 24', 24" with a protrusion, e.g., the assembly component 70, 82, 90, extending from the face of the magnet assembly 24, 24', 24" respectively, engaging an engagement structure, e.g., the assembly component 60, 80, 96, mounted to or defined by the magnet assembly 18, 18', 18" respectively. It will be understood that in some alternate embodiments the assembly component 70, 82 and/or 90, may extend from the face of the magnet assembly 18, 18' and/or 18" respectively, and the assembly component 60, 80 and/or 96 may be mounted to or defined by the magnet assembly 24, 24' and/or 24" respectively.

In another alternate embodiment, a variant of the embodiment illustrated in FIGS. 4A-5C is envisioned in which the slots 74A, 74B formed on the assembly component 70 are instead formed on and in the face of the outer rim of the magnet housing 42, and in which the retention clip 60 is mounted to or about the magnet assembly 24 and sized, i.e., enlarged, so as to engage with the slots 74A, 74B formed on and in the face of the outer rim of the magnet housing 42. Operation of this variant is as described above with respect to FIGS. 4A-5C. In an alternate embodiment of this variant, the slots 74A, 74B may be formed on and in the face of the outer rim of the magnet assembly 52 or the chassis 50, and the retention clip 60, suitably sized, may be mounted to or about the magnet assembly 18.

In yet another variant, additional annular space may be provided on the magnet housing 42 between the lock receiver 46 and the magnets 44 or between the magnets 44 and the outer periphery of the magnet housing 42, and a suitably sized ring structure with the slots 74A, 74B formed therein may be mounted to the face of the magnet housing 42, and a retention clip 60 may be mounted to a corresponding portion of the face magnet housing 52 and suitably sized, i.e., enlarged, so as to engage with the slots 74A, 74B formed on and in the ring structure. In an alternate embodiment of this variant, the additional annular space may be provided on the magnet housing 52 with the suitably-sized, slot-bearing ring structure mounted to the face thereof, and with the suitably sized retention clip 60 mounted to the face of the magnet housing 42.

Another example of a field-coupling and retention assembly for securing co-mounted doors together and to be utilized as part of a connection of door handle assemblies between a door 12 and a door 14 is illustrated in FIGS. 10-16. The retention assembly 100 is provided for the retention of the doors 12 and 14 together under controlled circumstances in addition to a field coupling as described above.

Figure 10:
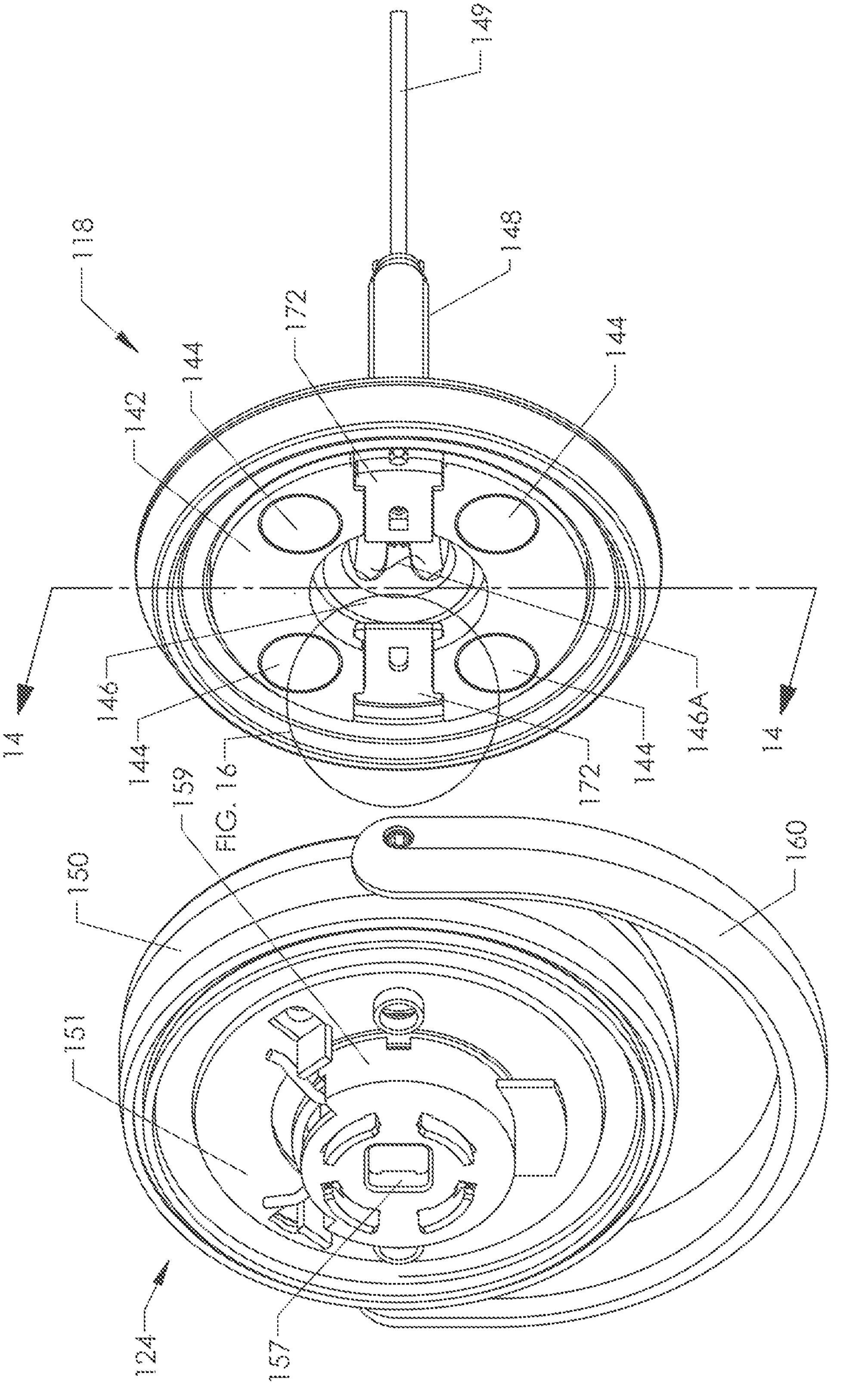
FIG. 10 is a perspective view of another embodiment of a retention assembly including first and second magnet assemblies showing a front face of the first magnet assembly and a rear face of the second magnet assembly.
Figure 11:
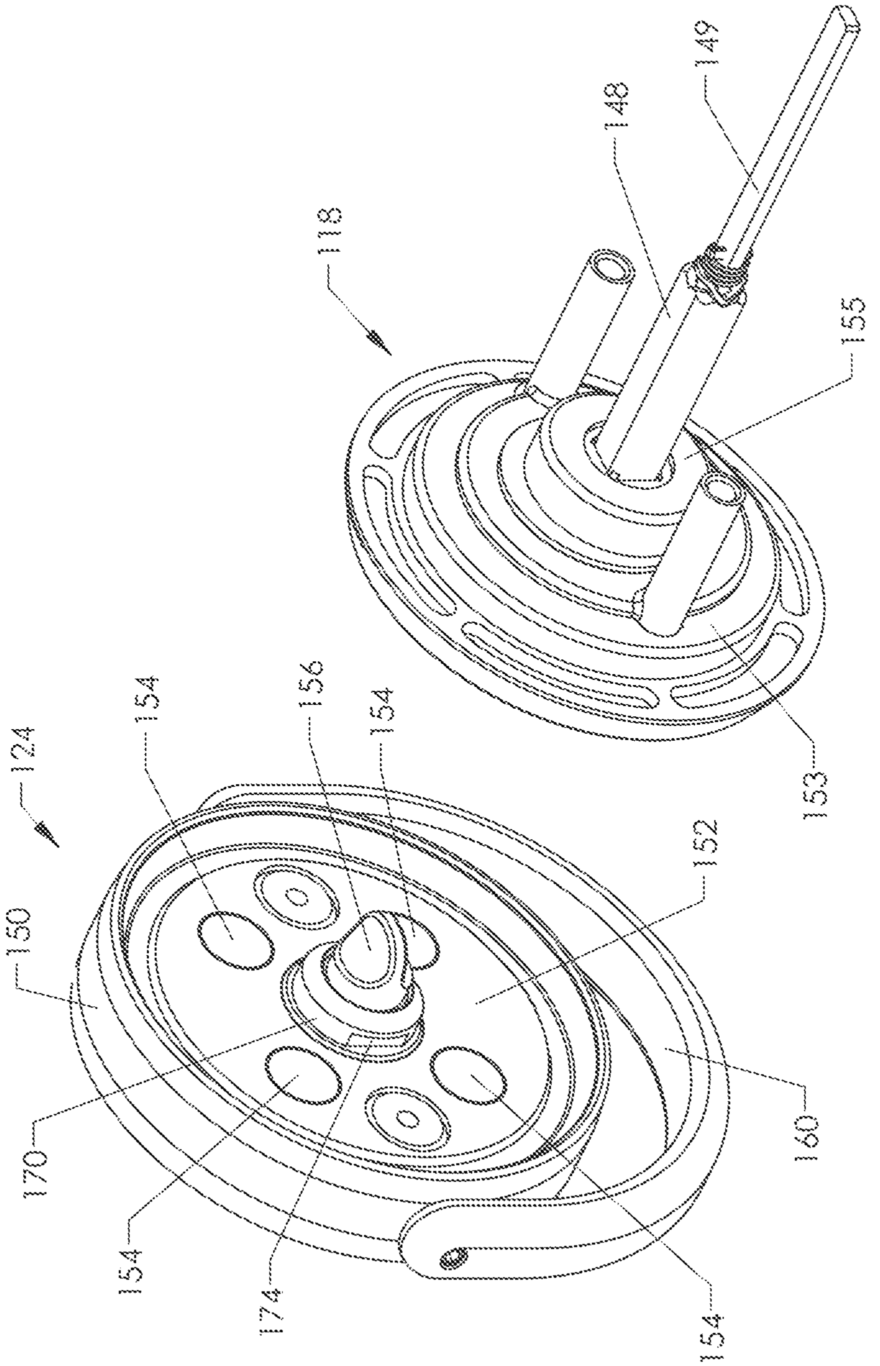
FIG. 11 is a perspective view of the retention assembly of FIG. 10 including the first and second magnet assemblies showing a rear face of the first magnet assembly and a front face of the second magnet assembly.

As shown in FIGS. 10 and 11, the field-coupling and retention assembly comprises a first magnet assembly 118 as can be provided to door 12 and a second magnet assembly 124 as can be provided to door 14. The magnet assembly 118 comprises a magnet housing 142 with plural spaced magnets 144 and the magnet assembly 124 comprises a magnet housing 152 with plural spaced magnets 154. Magnet housing 152 is fitted to a chassis 151 with a rear portion 159 of the magnet assembly 124 extending rearward from the chassis 151. The chassis is to be mounted to an inside surface of door 14 and the magnet assembly is rotatable relative to the chassis 151. The rear portion 159 of the chassis 151 includes an opening 157 for operative rotary connection with a latch set shaft. As such, the magnet housing 152 is rotatable relative to the chassis 151 with the latch shaft when rotated to open door 14. Likewise, magnet housing 142 is operatively rotationally connected with another latch shaft 148 of door 12 by way of a rear portion 155 with an opening for the latch shaft 148, all of which are rotatable relative to a chassis 153, such as provided and secured within a bore of door 12 when the latch set is rotated to open door 12. A locking spindle 149 is also provided to the magnet assembly 118. A protrusion 156 extends from the magnet assembly 124 as part of a locking function of that door's handle assembly and is accommodated by a recess 146A of a cylindrical lock receiver 146 of the magnet assembly 118. A handle 160 is shown connected with a ring 150 that is operatively connected with the magnet housing 152. The handle 160 and ring 150 thus also rotate with the magnet housing 152. As such, the handle 160 can be used in order to impart rotation to the magnet housing 152 if desired. The ring 160 and the magnet housing 152 are preferably made together as integral parts, although they need not be. These components are assembled in accordance with the latch or handset assemblies described above in FIGS. 1-5C.

As shown in FIG. 11, a ring retainer 170 is connected with the magnet housing 152 so as to be also rotatable with the magnet housing 152. As shown in FIG. 10, plural movable tabs 172 are movably supported to the face of the magnet housing 142. The combination of the tabs 172 and ring retainer 170 provide a handle set retention feature for the field coupled co-mounted doors described above.

The ring retainer 170 can be similar to the frustoconical ring described above and shown in FIGS. 5A-C including plural slots. The ring retainer 170 illustrated in FIGS. 11-13 and 15 is, however, different in that it comprises a cylindrical portion 171 that transitions to a curved portion 173 that decreases in diameter from the cylindrical portion 171. Instead of slots, the illustrated embodiment provides flat recesses 174 at plural locations around the circumference of the cylindrical portion 171, such as at diametrically opposed locations. Each recess 174 includes a ledge 175 within the cylindrical portion 171 that creates an interference surface used for retention as described below.

Figure 14:
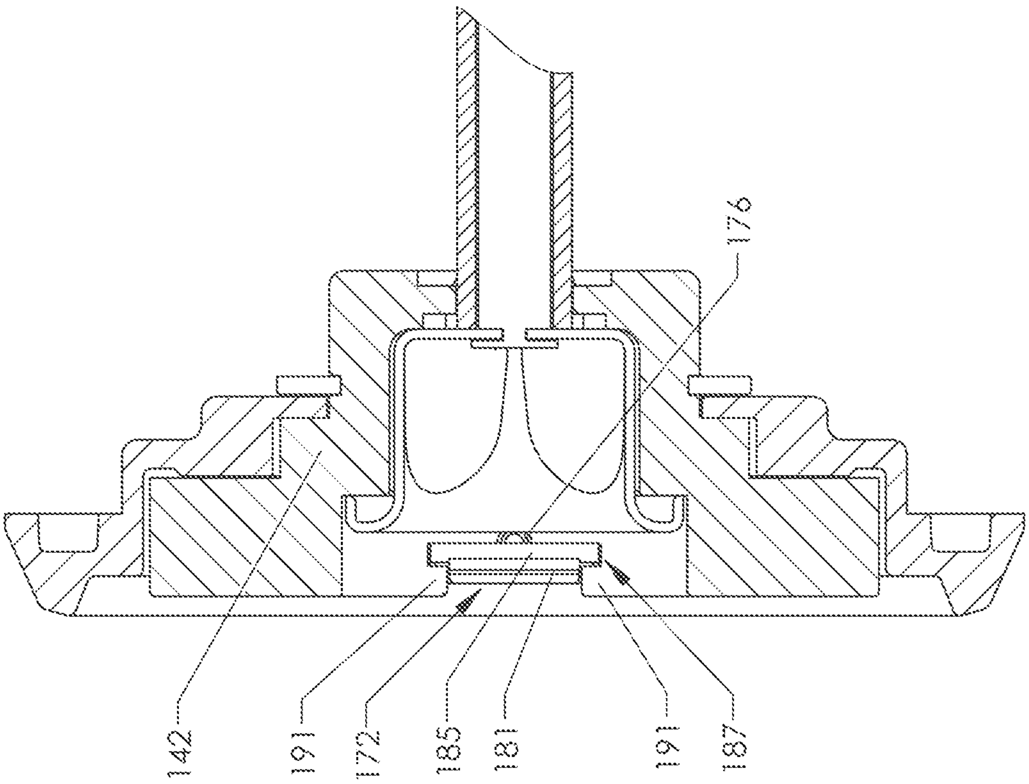
FIG. 14 is cross sectional view taken along a vertical diametrical line of the first magnet assembly as viewed in FIG. 10.
Figure 15:
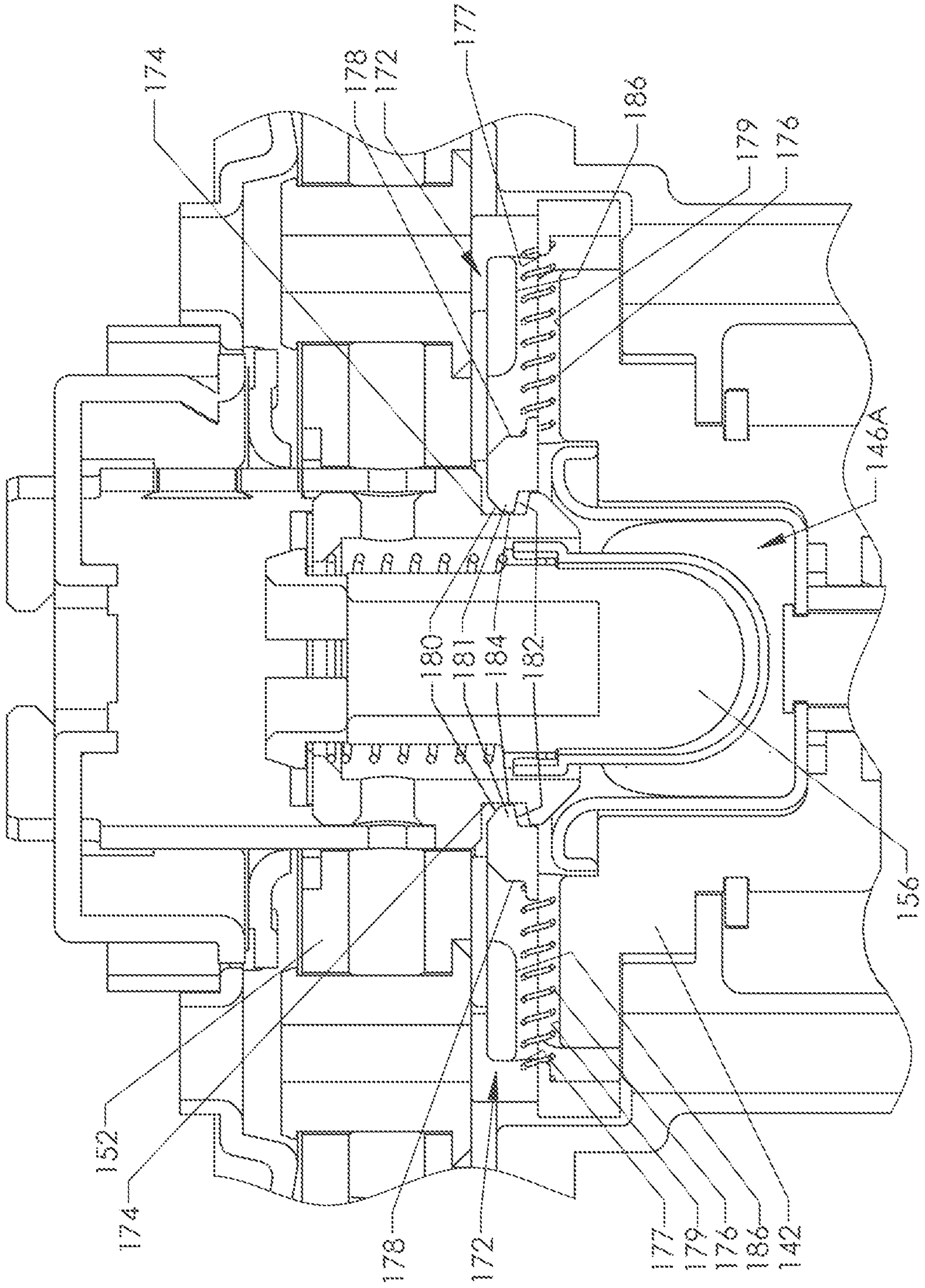
FIG. 15 is a cross sectional view of the first and second magnet assemblies in an interlocked state taken along a horizontal diametrical line perpendicular to the cross section of FIG. 14.

FIG. 10 shows the movable tabs 172 slidable relative to a face surface of the magnet housing 142. FIGS. 14 and 15 show each of the tabs 172 as being biased by a compression spring 176 radially inward. Each compression spring 176 is shown as biased between a surface 177 of a groove 179 recessed within the face of the magnet housing 142 and a surface 178 within a recessed groove 186 of the tab 172. By utilizing flat or straight surfaces for the recess 174 surface and the very tip of the tab 172, a good interference can be provided. Other shapes are contemplated such as including a curved surface or surfaces. Preferably, the surfaces are complimentary, although not necessarily.

Preferably included at the front end of each tab 172 is a tapered tip 181 that is sized and shaped for insertion and contact within a recess 174. As best seen in FIG. 15, the tapered tip 181 is preferably tapered at both sides of a flat tip surface 184. A taper 180 on one side of the flat tip surface 184 provides alignment during connection and facilitates engagement and coupling between a tab 172 and a recess 174. The taper 180 allows for more gradual interaction between the tab 172 and the curved/sloped portion 173 of the ring retainer 170 during a connection process. A taper 182 preferably provided on the other side of the flat tip surface 184 from taper 180 is provided for controlled disengagement. The illustrated arrangement provides for a controlled disengagement based upon the application of a threshold separation force. Preferably, the overhang surface of the recess 174 is also similarly tapered, but need not be. Upon the application of a force at or over a threshold separation force, the magnet assemblies 118 and 124 can separate from one another due to the tapers interaction like cams tending to move the tabs 172 against their bias to retract and allow separation. It is contemplated that the design of such tapered surfaces can be modified to change the ease or difficultly of such separation. For example, if a design is desired with a more positive interlock of the tabs 172 and the recesses 174, the interacting surfaces could be non-tapered and flat or even reversely sloped to increase the interlock. This could be designed to the degree requiring breakage before any separation, if desired.

Figure 16:
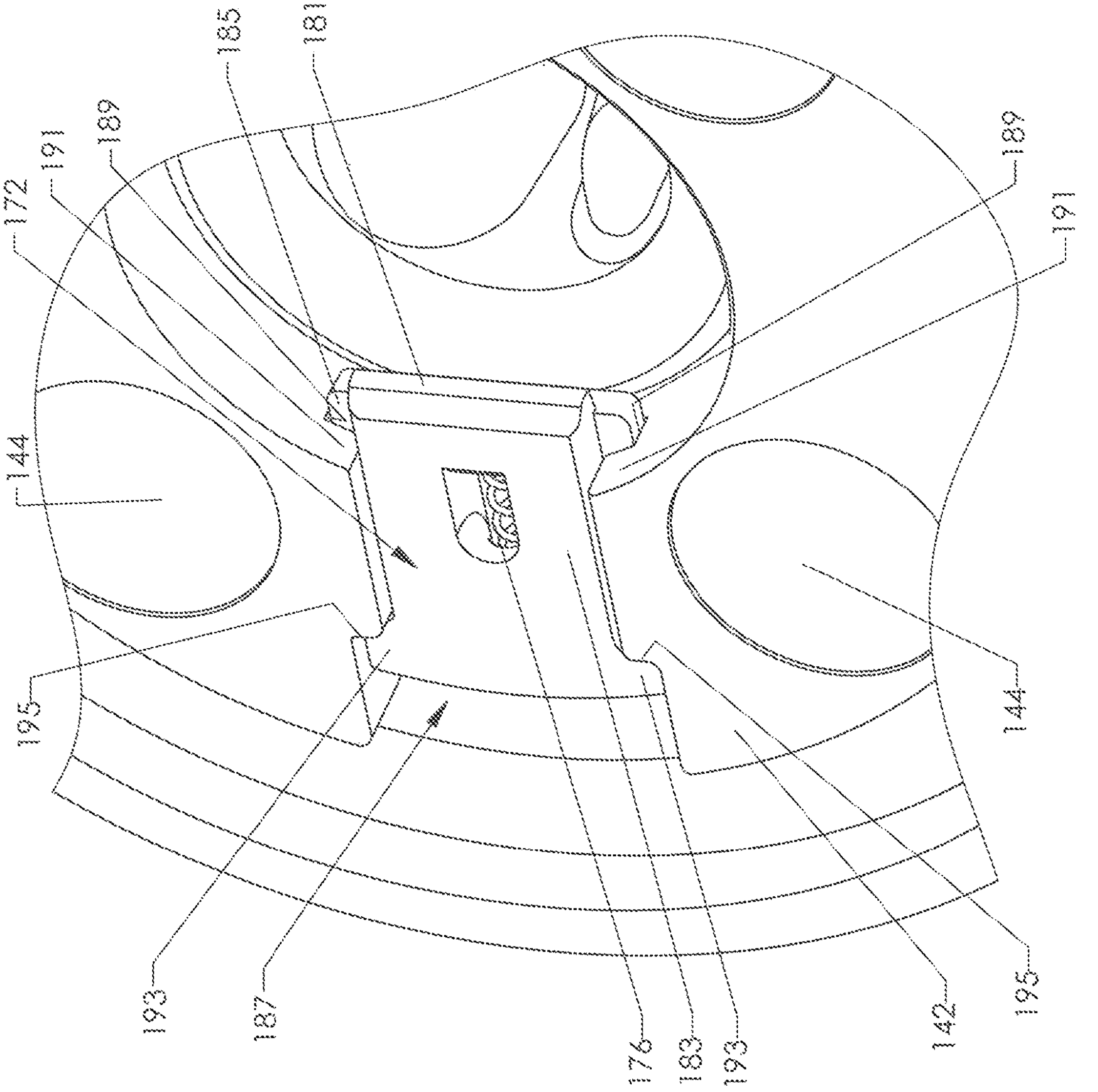
FIG. 16 is an enlarged perspective view of a tab as slidably guided by structure at the face of a magnet housing.

As shown if FIG. 16, the tapered tip 181 is preferably provided at a front edge of a top portion 183 of the tab 172 that is narrower in width than a lower portion 185 of the tab 172. The lower portion 185 is wider in order to provide slide surfaces to engage within a slotted radial opening 187 provided within the face of the magnet housing 142. Such a slotted radial opening is provided for each tab 172. Slots 189 extend wider than the opening 187 below overhang portions 191 of the magnet housing 142 to create the guide slots 189 within which the side edges of the lower portion 185 are slidably guided under the influence of the bias force of springs 176. FIG. 15 shows the spring engaging surface 177 as formed as part of the groove 179 formed in the magnet housing 142, which surface 177 is below the tab 172 as shown in FIG. 16. In order to provide a positive stop to the tab 172 in the direction of the bias force, the top portion 183 is preferably provided with stopper portions 193 that are wider at the rear of the tab 172 to be positioned within a wider rear portion of the slotted opening 187 and to engage rear stop surfaces 195 of the overhang portions 191. A surface behind the tabs 172 that defines the rear of the opening 187 also acts as a limit for rearward movement of the tab 172 against its bias force.

FIG. 14 shows a tab 172 from a front view with the tab 172 being biased toward the viewer based upon a cross section taken through a vertical centerline of the magnet assembly 118 of FIG. 10. The compression spring 176 is only partially visible as most of it is within the grooves 179 and 186. The tab 172 is shown positioned within the slotted opening 187 and with the lower portion 185 below the overhang portions 191.

Like the embodiment of a retention assembly described above and referencing FIGS. 1-5C, the tabs 172 and recesses 174 operate to provide an interference interlock when the doors 12 and 14 are brought together. The shape of the ring retainer 170 and the tapered tips 181 control a movement of the tabs 172 against their bias when the doors 12 and 14 are brought together. Specifically, the tabs 172 move against the bias while their tips 181 ride along surface portion 173 of the ring retainer 170 to the point of when the tips 181 engage the cylindrical portion 171. Continued movement of the doors 12 and 14 toward one another leads to the tips 181 being biased into the recesses 174. A physical and mechanical interference is created in the axial direction of shaft 148 so long as the tabs 172 and recesses 174 remain engaged.

Figure 13:
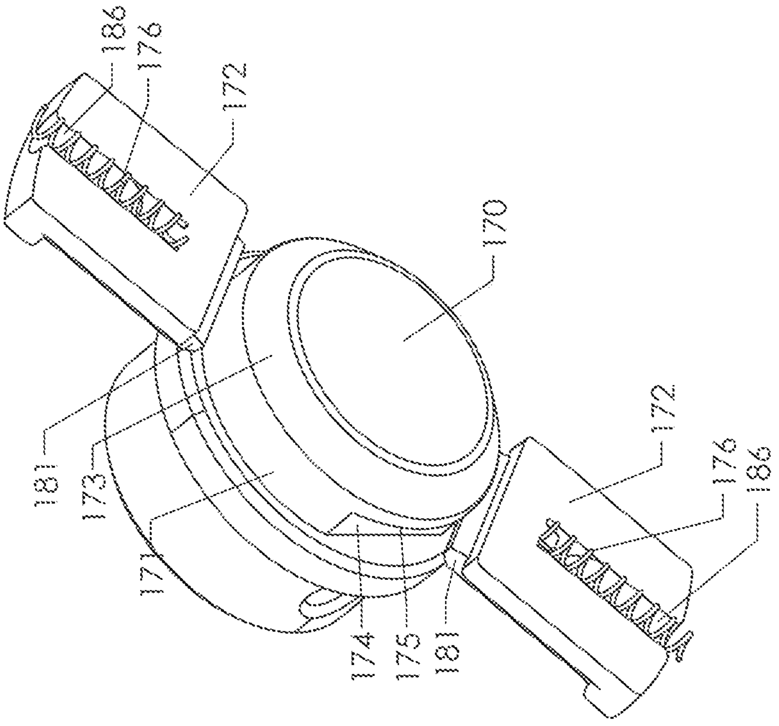
FIG. 13 is a perspective view similar to FIG. 12 but with the plural tabs retracted and positioned along a circumferential surface of the ring retainer rotationally spaced from the recesses.
Figure 12:
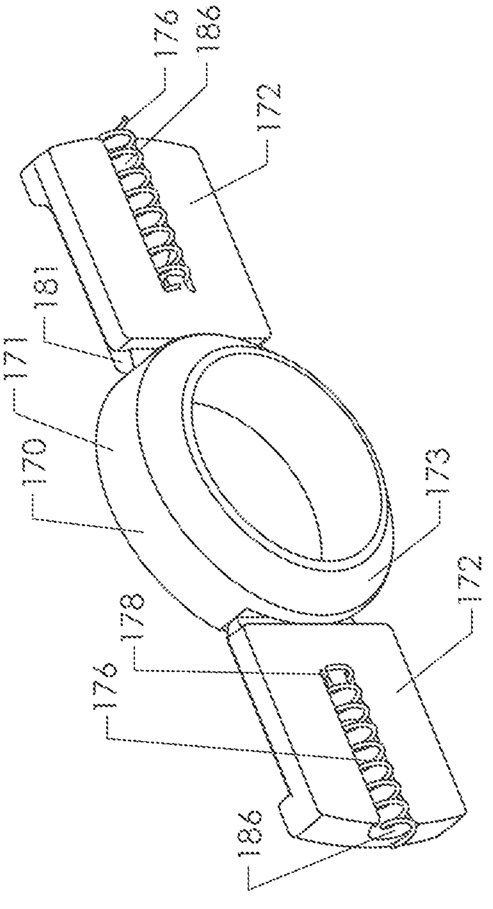
FIG. 12 is a perspective view of a combination of plural biased tabs in an engagement position with recesses of a ring retainer.

As above, the magnets 144 and 154 maintain the magnet housings 142 and 152 together for rotation. As the tabs 172 and the ring retainer 170 rotate with their respective magnet housings 142 and 152, engagement of the tabs 172 and recesses 174 is maintained also during rotation. However, rotation of the magnet housing 152 and ring retainer 170 may be limited in a rotational direction, such as in the case where the magnet housing 152 is limited by a mechanical stop to prevent one door handle from rotation in a rotational direction as described above. When the mechanical stop is attained for the magnet housing 152, the tabs 172 will be forced against their bias by continued rotation of magnet housing 142 to a non-engagement position by continued rotation of the tabs 172 relative to the stopped ring retainer 170. FIG. 12 shows the tabs 172 and recesses 174 in an engaged position, while FIG. 13 shows the tabs 172 retracted and riding along the circumferential surface of cylindrical portion 171. In the FIG. 13 configuration, the interlock created by the retention assembly 100 is disengaged and the doors 12 and 14 can be moved relatively away from one another.

It is understood that any number of tabs 172 from at least one would be effective in creating an interference interlock. Any manner of providing a bias to the tabs 172, such as including coil springs, leaf springs, gas, compressible materials, and the like are also contemplated. The bias can be provided in any way as operative between the magnet housing 142 or a component connected therewith and the tabs 172. Pins can be used instead of tabs 172 that could be cylindrical or other shapes so long as they are effectively guided and biased. A combination of one or more pins and tabs can be used.

It is contemplated as well that pins or tabs or combinations thereof could be radially outwardly biased for engagement with other structure of or connected with the magnet housing 152. For example, the magnet housing 152 could have a ring-like feature with an overhang within which tabs or pins could be biased for providing an interference interlock. A combination of radially inward and radially outward pins, tabs or combinations thereof can also be used to engage with radially outward and radially inward positioned engagement structure, respectively.

It is also contemplated that any combination of pins and tabs can be provided to the magnet housing 152 instead of housing 142 for engagement with a ring retainer or other structure provided instead to magnet housing 142.

As described above as to the sliding tabs 172, the tapered surfaces of the tab 172 and the recess 174 can be designed to create an interface that releases above the application of a threshold force to cause separation of the tabs 172 from the recesses 174. Also, that interface can be designed so that separation will not occur unless one of the components physically fail. As above, the angles of the tapered surfaces and physical properties such as coefficients of friction of the materials used can control this aspect. The same is true with any of the designs disclosed above or contemplated in accordance with the present invention. That is to say that any of the designs of the present invention can be designed to separate in the axial direction at any determined threshold force or they can be designed to not allow separation without failure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A handleset assembly for securing together linked handle assemblies of co-mounted doors each pivotably mounted at a hinge side thereof to a door frame, the handleset assembly comprising:

a first-side handle assembly including a first chassis to be mounted to a first door of the co-mounted doors, the first-side handle assembly also comprising a first rotatable component that is rotatable about an axis of rotation and that is rotatable relative to the first chassis and a first linkage element housing to be located on a side of the first door facing a side of a second door of the co-mounted doors, the first linkage element housing being rotatable along with the first rotatable component and including a first retention component; and a second-side handle assembly including a second chassis to be mounted to the second door, the second-side handle assembly also comprising a second rotatable component that is rotatable about the axis of rotation and that is rotatable relative to the second chassis and a second linkage element housing to be located on a side of the second door facing the first linkage element housing so as to interact with one another upon bringing the first and second linkage element housings toward and proximate to one another, the second linkage element housing being rotatable along with the second rotatable component and including a second retention component;

wherein the first and second rotatable components can be operatively rotatably connectable with one another when the first and second linkage element housings are in a linked position proximate to one another by at least one linkage element provided on each of the first and second linkage element housings, and further wherein the retention components engage with one another in the linked position of the first and second linkage element housings to create a mechanical interference in an axial direction of the axis of rotation of the first and second rotatable components so as to restrict movement of the first and second linkage element housings away from one another while the mechanical interference is created.

2. The handleset assembly of claim 1, wherein at least one of the retention components includes a radially movable element that can engage with a complimentary feature of the other retention component, the complimentary feature allowing movement in the radial direction of the radially movable element to be positioned at least partially behind the complimentary feature to create the mechanical interference in the axial direction.

3. The handleset assembly of claim 2, wherein the radially movable element is provided as a portion of a spring leg that is mounted to one of the linkage element housings with a portion of the spring leg radially movable by a biasing force in a radial direction to the mechanical interference position.

4. The handleset assembly of claim 3, wherein the first retention component comprises a retention clip having a plurality of spring legs connected together where plural of the spring legs are subject to a biasing force and positioned with plural spring legs spaced from one another so as to provide plural radially movable elements, and the second retention component comprises a retention ring located to the second linkage element housing having a plurality of slots positioned to engage the spring legs as the first and second linkage housings are brought proximate to one another, the retention ring shaped to move the spring legs relative to one another against the biasing force prior to engagement within the slots.

5. The handleset assembly of claim 2, wherein the radially movable element is provided as a tab that is slidably supported to one of the first and second linkage element housings for engagement with a notch of a non-rotational component of the other of the first and second linkage element housings.

6. The handleset assembly of claim 5, wherein the radially movable element is biased radially and the non-rotational component is shaped to cause the radially movable element to move against the bias prior to engagement within the notch under the influence of the bias force.

7. The handleset assembly of claim 5, wherein at least two radially movable elements are provided that are biased radially to engage with a similar plurality of similarly positioned notches, the radially movable elements and notches operatively provided to a combination of the first and second linkage housings and the non-rotational component.

8. The handleset assembly of claim 2, wherein a post is mounted to one linkage element housing of the first and second linkage element housings to extend axially therefrom and including a laterally extending element, the one linkage element housing facing the other linkage element housing of the first and second the linkage element housings having an opening sized to receive the post and lateral element, wherein after the post is received by the opening, the lateral extending element can be positioned so as to engage with a backside of the other linkage element housing about the opening.

9. The handset assembly of claim 8, wherein the laterally extending element comprises an outwardly biased element that can be moved inwardly against the bias in order to pass through the opening and thereafter can move outwardly under the bias to engage the backside of the other linkage housing.

10. The handleset assembly of claim 2, wherein a post is mounted to extend from one of the first and second chassis through a first arcuate opening of one of the linkage element housings of the same handle assembly to extend axially therefrom and toward the other of the linkage element housings also having an arcuate opening, the post having a pin portion and a head portion sized to pass through a wide portion of the second arcuate opening, and the opening having at least one narrow end key-slot portion that is sized to allow the pin portion of the post to move along the key-slot but to interfere with the head portion from axial movement when the linkage element housing with the second arcuate slot is rotated to position the pin portion of the post in the key-slot.

11. The handleset assembly of claim 2, wherein an interaction of contacting surfaces of the radially movable element and the complimentary feature, when in engagement, provides for a controlled separation of the radially movable element from the complimentary feature upon the provision of a separation force to the first and second linkage element housings greater than a threshold separation force by causing the radially movable element to move against its bias force.

12. A handleset assembly for securing together linked handle assemblies of co-mounted doors each pivotably mounted at a hinge side thereof to a door frame, the handleset assembly comprising:

a first-side handle assembly including a first chassis to be mounted to a first door of the co-mounted doors, the first-side handle assembly also comprising a first rotatable component that is rotatable about an axis of rotation and that is rotatable relative to the first chassis and a first housing to be located on a side of the first door facing a side of a second door of the co-mounted doors, the first housing being rotatable along with the first rotatable component and including a first retention component; and a second-side handle assembly including a second chassis to be mounted to the second door, the second-side handle assembly also comprising a second rotatable component that is rotatable about the axis of rotation and a second housing to be located on a side of the second door facing the first housing so as to be positioned adjacent one another upon bringing the first and second housings proximate to one another, the second housing being rotatable along with the second rotatable component and including a second retention component;

wherein the first and second rotatable components can be operatively rotatably connectable with one another when in the adjacent position of the first and second housings to one another, and further wherein the retention components can engage with one another in the adjacent position of the first and second housings to create a mechanical interference in an axial direction of the axis of rotation of the first and second rotatable components so as to restrict movement of the first and second housings away from one another while the mechanical interference is created.

13. The handleset assembly of claim 12, wherein at least one of the retention components includes a radially movable element that can engage with a complimentary feature of the other retention component, the complimentary feature allowing movement in the radial direction of the radially movable element to be positioned at least partially behind the complimentary feature to create the mechanical interference in the axial direction.

14. The handleset assembly of claim 13, wherein the radially movable element is provided as a portion of a spring leg that is mounted to one of the first and second housings with a portion of the spring leg radially movable by a biasing force in a radial direction to the mechanical interference position.

15. The handleset assembly of claim 14, wherein the first retention component comprises a retention clip having a plurality of spring legs connected together where plural of the spring legs are biased toward one another and positioned with plural spring legs spaced from one another so as to provide plural radially movable elements, and the second retention component comprises a retention ring located to the second housing having a plurality of slots positioned to engage the spring legs as the first and second housings are brought proximate to one another, the retention ring shaped to move the spring legs relative to one another against the biasing force prior to engagement within the slots.

16. The handleset assembly of claim 13, wherein the radially movable element is provided as a tab that is slidably supported to one of the first and second housings for engagement with a notch of a non-rotational component of the other of the first and second housings.

17. The handleset assembly of claim 16, wherein the radially movable element is biased radially and the non-rotational component is shaped to cause the radially movable element to move against the bias prior to engagement within the notch under the influence of the bias force.

18. The handleset assembly of claim 16, wherein at least two radially movable elements are provided that are biased radially to engage with a similar plurality of similarly positioned notches, the radially movable elements and notches operatively provided to a combination of the first and second housings and the non-rotational component.

19. The handleset assembly of claim 13, wherein a post is mounted to one housing of the first and second housings to extend axially therefrom and including a laterally extending element, the one housing facing the other housing of the first and second the housings having an opening sized to receive the post and lateral element, wherein after the post is received by the opening, the lateral extending element can be positioned so as to engage with a backside of the other housing about the opening.

20. The handset assembly of claim 19, wherein the laterally extending element comprises an outwardly biased element that can be moved inwardly against the bias in order to pass through the opening and thereafter can move outwardly under the bias to engage the backside of the other housing.

21. The handleset assembly of claim 13, wherein a post is mounted to extend from one of the first and second chassis through a first arcuate opening of one of the housings of the same handle assembly to extend axially therefrom and toward the other of the housings also having an arcuate opening, the post having a pin portion and a head portion sized to pass through a wide portion of the second arcuate opening, and the opening having at least one narrow end key-slot portion that is sized to allow the pin portion of the post to move along the key-slot but to interfere with the head portion from axial movement when the housing with the second arcuate slot is rotated to position the pin portion of the post in the key-slot.

22. The handleset assembly of claim 13, wherein an interaction of contacting surfaces of the radially movable element and the complimentary feature, when in engagement, provides for a controlled separation of the radially movable element from the complimentary feature upon the provision of a separation force to the first and second housings greater than a threshold separation force by causing the radially movable element to move against its bias force.

23. A door assembly for selectively interlocking first and second co-mounted doors each pivotably mounted at a hinge side thereof to a door frame so as to both open and close in the same rotary direction, the door assembly comprising:

- a door jamb, the door jamb including a hinge-side jamb spaced apart from a latch-side jamb;
- the first door, the first door having the hinge side and a latch side opposite the hinge side thereof;
- the second door, the second door having the hinge side and a latch side opposite the hinge side thereof, the hinge sides of the first and second doors both pivotably mounted to the hinge-side jamb such that the first and second doors pivot individually or together in the same rotary direction relative to the hinge-side jamb between open and closed positions; and
- a handleset assembly for securing together linked handle assemblies of co-mounted doors each pivotably mounted at a hinge side thereof to a door frame, the handleset assembly comprising:
  - a first-side handle assembly including a first chassis to be mounted to the first door of the co-mounted doors, the first-side handle assembly also comprising a first rotatable component that is rotatable about an axis of rotation and that is rotatable relative to the first chassis and a first linkage element housing to be located on a side of the first door facing a side of the second door of the co-mounted doors, the first linkage element housing being rotatable along with the first rotatable component and including a first retention component; and
  - a second-side handle assembly including a second chassis to be mounted to the second door, the second-side handle assembly also comprising a second rotatable component that is rotatable about the axis of rotation and that is rotatable relative to the second chassis and a second linkage element housing to be located on a side of the second door facing the first linkage element housing so as to interact with one another upon bringing the first and second linkage element housings toward and proximate to one another, the second linkage element housing being rotatable along with the second rotatable component and including a second retention component;
  - wherein the first and second rotatable components can be operatively rotatably connectable with one another when the first and second linkage element housings are in a linked position proximate to one another by at least one linkage element provided on each of the first and second linkage element housings, and further wherein the retention components engage with one another in the linked position of the first and second linkage element housings to create a mechanical interference in an axial direction of the axis of rotation of the first and second rotatable components so as to restrict movement of the first and second linkage element housings away from one another while the mechanical interference is created.

24. A door assembly for selectively interlocking first and second co-mounted doors each pivotably mounted at a hinge side thereof to a door frame so as to both open and close in the same rotary direction, the door assembly comprising:

a door jamb, the door jamb including a hinge-side jamb spaced apart from a latch-side jamb;

the first door, the first door having the hinge side and a latch side opposite the hinge side thereof;

the second door, the second door having the hinge side and a latch side opposite the hinge side thereof, the hinge sides of the first and second doors both pivotably mounted to the hinge-side jamb such that the first and second doors pivot individually or together in the same rotary direction relative to the hinge-side jamb between open and closed positions; and a handleset assembly for securing together linked handle assemblies of co-mounted doors each pivotably mounted at a hinge side thereof to a door frame, the handleset assembly comprising:

a first-side handle assembly including a first chassis to be mounted to the first door of the co-mounted doors, the first-side handle assembly also comprising a first rotatable component that is rotatable about an axis of rotation and that is rotatable relative to the first chassis and a first housing to be located on a side of the first door facing a side of the second door of the co-mounted doors, the first housing being rotatable along with the first rotatable component and including a first retention component; and a second-side handle assembly including a second chassis to be mounted to the second door, the second-side handle assembly also comprising a second rotatable component that is rotatable about the axis of rotation and that is rotatable relative to the second chassis and a second housing to be located on a side of the second door facing the first housing so as to interact with one another upon bringing the first and second housings toward and proximate to one another, the second housing being rotatable along with the second rotatable component and including a second retention component;

wherein the first and second rotatable components can be operatively rotatably connectable with one another when in the adjacent position of the first and second housings to one another, and further wherein the retention components can engage with one another in the adjacent position of the first and second housings to create a mechanical interference in an axial direction of the axis of rotation of the first and second rotatable components so as to restrict movement of the first and second housings away from one another while the mechanical interference is created.

* * * * *